(12) United States Patent
Haensch et al.

(10) Patent No.: US 9,787,473 B2
(45) Date of Patent: Oct. 10, 2017

(54) CARBON NANOTUBE ARRAY FOR CRYPTOGRAPHIC KEY GENERATION AND PROTECTION

(71) Applicant: International Business Machines Corporation, Armonk, NY (US)

(72) Inventors: Wilfried Haensch, Somers, NY (US); Shu-Jen Han, Cortlandt Manor, NY (US); Keith A. Jenkins, Sleepy Hollow, NY (US); Dirk Pfeiffer, Croton on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 14/749,092

(22) Filed: Jun. 24, 2015

(65) Prior Publication Data

US 2017/0063543 A1 Mar. 2, 2017

Related U.S. Application Data

(63) Continuation of application No. 14/586,103, filed on Dec. 30, 2014.

(51) Int. Cl.
*H04L 9/38* (2006.01)
*H04L 9/08* (2006.01)
*G09C 1/00* (2006.01)

(52) U.S. Cl.
CPC .............. *H04L 9/0861* (2013.01); *G09C 1/00* (2013.01); *H04L 9/0866* (2013.01); *H04L 2209/12* (2013.01)

(58) Field of Classification Search
None
See application file for complete search history.

(56) References Cited

U.S. PATENT DOCUMENTS 7,301,191 B1 * 11/2007 Tombler ................ B82Y 10/00
257/296
7,433,225 B2 10/2008 Worledge
(Continued)

OTHER PUBLICATIONS

S.T. Choden Konigsmark et al., "CNPUF: A Carbon Nanotube-based Physically Unclonable Function for Secure Low-Energy Hardware Design," 19th Asia and South Pacific Design Automation Conference (ASP-DAC), Jan. 20-23, 2014, pp. 73-78.
(Continued)

*Primary Examiner* — Michael R Vaughan
(74) *Attorney, Agent, or Firm* — Vazken Alexanian; Michael J. Chang, LLC

(57) ABSTRACT

Techniques for use of carbon nanotubes as an anti-tampering feature and for use of randomly metallic or semiconducting carbon nanotubes in the generation of a physically unclonable cryptographic key generation are provided. In one aspect, a cryptographic key having an anti-tampering feature is provided which includes: an array of memory bits oriented along at least one bit line and at least one word line, wherein each of the memory bits comprises a memory cell, wherein the cryptographic key is stored in the memory cell, and wherein the memory cell is connected to the at least one bit line; and a metallic carbon nanotube interconnect which connects the memory cell to the at least one word line. A cryptographic key and method for processing the cryptographic key are also provided.

8 Claims, 13 Drawing Sheets

(56) References Cited

U.S. PATENT DOCUMENTS

| | | | |
|---|---|---|---|
| 8,189,419 B2 | 5/2012 | Chen et al. | |
| 8,379,856 B2 | 2/2013 | Potkonjak | |
| 8,592,955 B2 | 11/2013 | Duerig et al. | |
| 8,766,258 B1 | 7/2014 | Dimitrakopoulos et al. | |
| 9,190,134 B2* | 11/2015 | Samachisa | B82Y 10/00 |
| 2006/0064587 A1* | 3/2006 | Braverman | G07C 9/00309 |
| | | | 713/168 |
| 2006/0255414 A1* | 11/2006 | Appenzeller | B82Y 10/00 |
| | | | 257/401 |
| 2007/0114613 A1* | 5/2007 | Byrn | H01L 21/76838 |
| | | | 257/368 |
| 2008/0012047 A1* | 1/2008 | Bertin | B82Y 10/00 |
| | | | 257/213 |
| 2009/0213649 A1* | 8/2009 | Takahashi | G06Q 20/341 |
| | | | 365/184 |
| 2010/0050901 A1 | 3/2010 | Biris et al. | |
| 2010/0149895 A1* | 6/2010 | Kim | B82Y 10/00 |
| | | | 365/207 |
| 2010/0171099 A1* | 7/2010 | Tombler, Jr. | B82Y 10/00 |
| | | | 257/40 |
| 2010/0295025 A1* | 11/2010 | Appenzeller | B82Y 10/00 |
| | | | 257/24 |
| 2012/0068326 A1* | 3/2012 | Das | H01L 23/42 |
| | | | 257/687 |
| 2012/0183135 A1 | 7/2012 | Paral et al. | |
| 2013/0126830 A1* | 5/2013 | Cao | B82Y 10/00 |
| | | | 257/24 |
| 2013/0210211 A1* | 8/2013 | Vereen | H01L 45/1233 |
| | | | 438/382 |
| 2013/0232587 A1* | 9/2013 | Boday | B82Y 15/00 |
| | | | 726/34 |
| 2014/0312248 A1* | 10/2014 | Beck | G01N 21/65 |
| | | | 250/459.1 |
| 2014/0364574 A1* | 12/2014 | Afzali-Ardakani | C08G 75/06 |
| | | | 525/327.2 |
| 2015/0221884 A1* | 8/2015 | Han | H01L 51/0545 |
| | | | 257/29 |
| 2015/0235053 A1* | 8/2015 | Lee | G06F 21/72 |
| | | | 713/193 |
| 2016/0016801 A1* | 1/2016 | Bryan | B82Y 30/00 |
| | | | 423/447.2 |
| 2016/0087232 A1* | 3/2016 | Franklin | H01L 51/0554 |
| | | | 438/158 |

OTHER PUBLICATIONS

S.T. Choden Konigsmark et al., "CNPUF: A Carbon Nanotube-based Physically Unclonable Function for Secure Low-Energy Hardware Design," 19th Asia and South Pacific Design Automation Conference (ASP-DAC), Jan. 20-23, 2014, slide presentation.

Suh et al., "Physical unclonable functions for device authentication and secret key generation," Proceedings of the 44th annual Design Automation Conference DAC '07, pp. 9-14 (Jun. 2007).

Tulevski et al., "High Purity Isolation and Quantification of Semiconducting Carbon Nanotubes via Column Chromatography," ASC Nano, vol. 7, No. 4, pp. 2971-2976 (Mar. 2013).

B. Yoon et al., "Recent functional material based approaches to prevent and detect counterfeiting," J. Mater. Chem. C, 1, 2388-2403 (Jan. 2013).

Park et al. "High-density integration of carbon nanotubes via chemical self-assembly," Nature Nanotechnology, 7, 787-791 (Oct. 2012).

Pappu et al., "Physical One-Way Functions," Science, vol. 297, pp. 2026-2030 (Sep. 2002).

Gassend et al., "Silicon Physical Random Functions," Proceedings of the $9^{th}$ ACM conference on Computer CCS '02, pp. 148-160 (Nov. 2002).

Maes et al., "Physically Unclonable Functions: A Study on the State of the Art and Future Research Directions," Towards Hardware-Intrinsic Security, Information Security and Cryptography 2010, pp. 3-37 (Oct. 2010).

S.S. Mansouri et al., "Ring Oscillator Physical Unclonable Function with Multi Level Supply Voltages," IEEE $30^{th}$ International Conference on Computer Design (ICCD), pp. 520-521 (Sep./Oct. 2012).

Beckmann et al., "Hardware-Based Public-Key Cryptography with Public Physically Unclonable Functions," Lecture Notes in Computer Science, vol. 5806, pp. 206-220 (2009).

Rose et al., "Hardware Security Strategies Exploiting Nanoelectronic Circuits," 2013 $18^{th}$ Asia and South Pacific Design Automation Conference (ASP-DAC), pp. 368-372 (Jan. 2013).

Rose et al., "Nanoelectronics and Hardware Security," Network Science and Cybersecurity, Advances in Information Security, vol. 55, pp. 105-123 (2014).

Demirok et al., "Orthogonal Multi-Readout Identification of Alloy Nanowire Barcodes," J. Am. Chem. Soc. 131, 22-23 (Dec. 2008).

Kim et al., "Anti-counterfeit nanoscale fingerprints based on randomly distributed nanowires," Nanotechnology 25, 155303 (Mar. 2014).

Rajendran et al., "Nano-PPUF: A Memristor-Based Security Primitive," 2013 IEEE Computer Society Annual Symposium on VLSI (ISVLSI), pp. 84-87 (Aug. 2012).

Krishnamurthy et al., "High-performance energy-efficient encryption in the sub-45nm CMOS era," 2011 48th ACM/EDAC/IEEE Design Automation Conference (DAC) (Jun. 2011).

Shahrjerdi et al., "High Performance Air-Stable n-Type Carbon Naotube Transistors with Erbium Contacts," ACS Nano, 2013, 7(9), pp. 8303-8308 (Sep. 2013).

Gassend et al., "Silicon Physical Random Functions," Proceedings of the 9th ACM conference on Computer and communications security CCS '02, pp. 148-160 (Nov. 2002).

S.S. Mansouri et al., "Ring Oscillator Physical Unclonable Function with Multi Level Supply Voltages," 2012 IEEE 30th International Conference on Computer Design (ICCD), pp. 520-521 (Sep./Oct. 2012).

Rose et al., "Hardware Security Strategies Exploiting Nanoelectronic Circuits," 2013 18th Asia and South Pacific Design Automation Conference (ASP-DAC), pp. 368-372 (Jan. 2013).

Shahrjerdi et al., "High-Performance Air-Stable n-Type Carbon Nanotube Transistors with Erbium Contacts, " ACS Nano, 2013, 7(9), pp. 8303-8308 (Sep. 2013).

Suh et al., "Physical unclonable functions for device authentication and secret key generation," Proceedings of the $44^{th}$ annual Design Automation Conference DAC '07, pp. 9-14 (Jun. 2007).

* cited by examiner

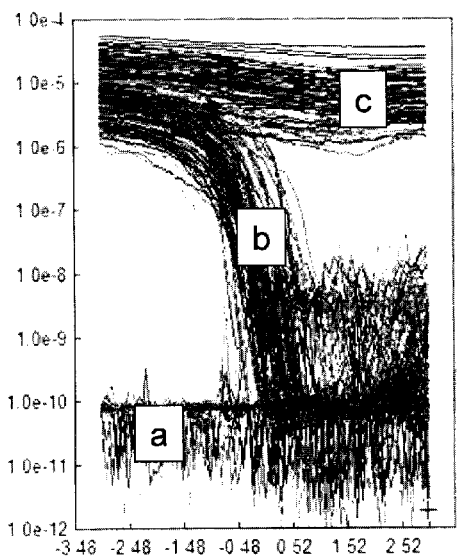
FIG. 20a
CNT bit output states
| type $V_g$ | a (O) | b (S) | c (M) |
|---|---|---|---|
| 1 | 0 | 1 | 1 |
| 0 | 0 | 0 | 1 |
FIG. 20b
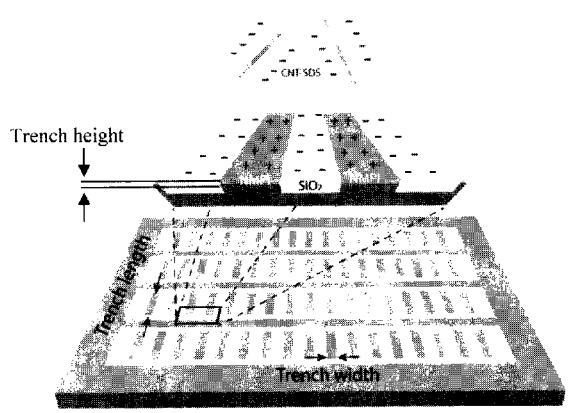
FIG. 21
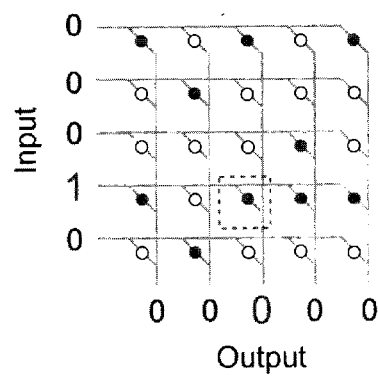
• connected by CNT
○ disconnected
FIG. 22

FIGS. 23a-f

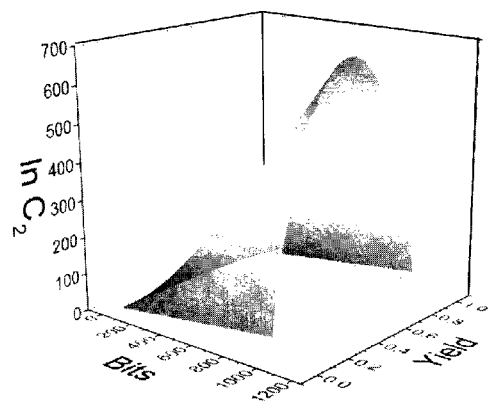
FIG. 24
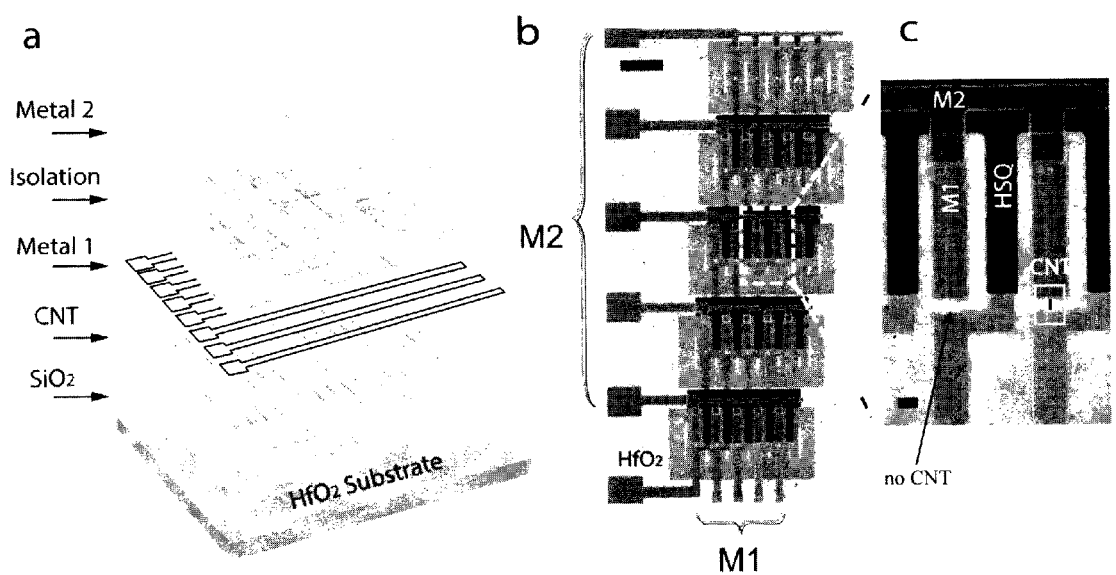
FIGS. 25a-c

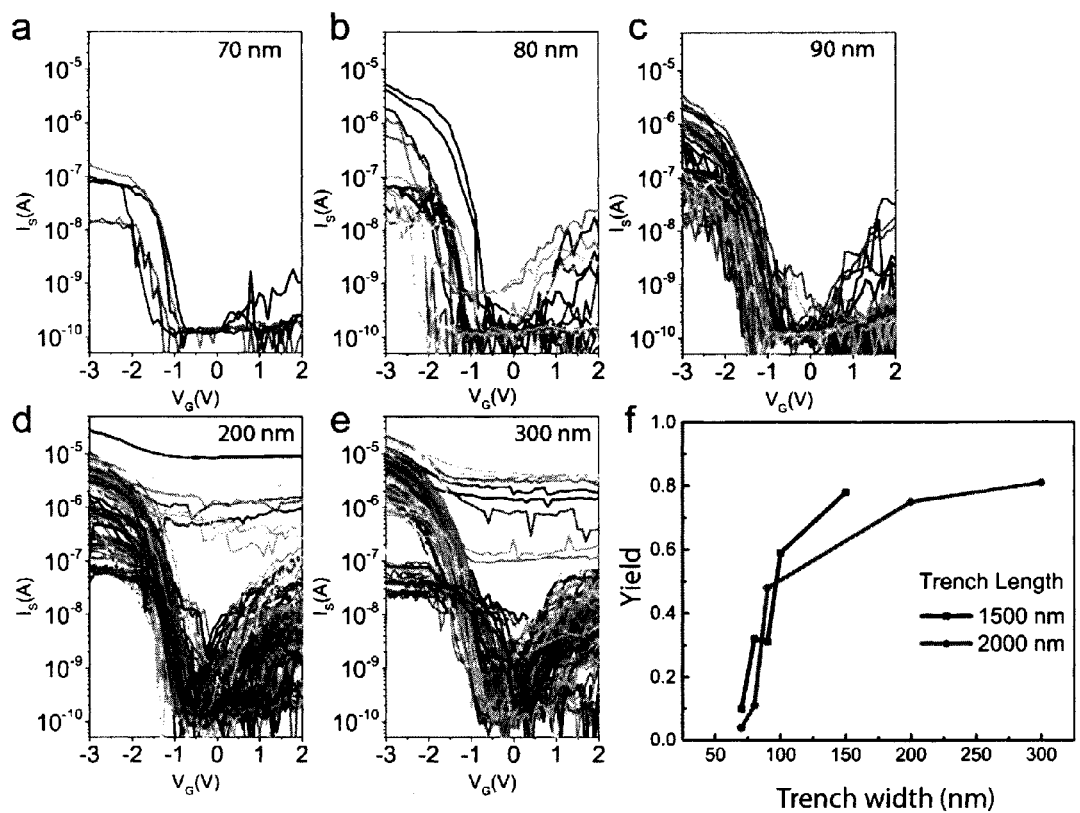
FIGS. 26a-f

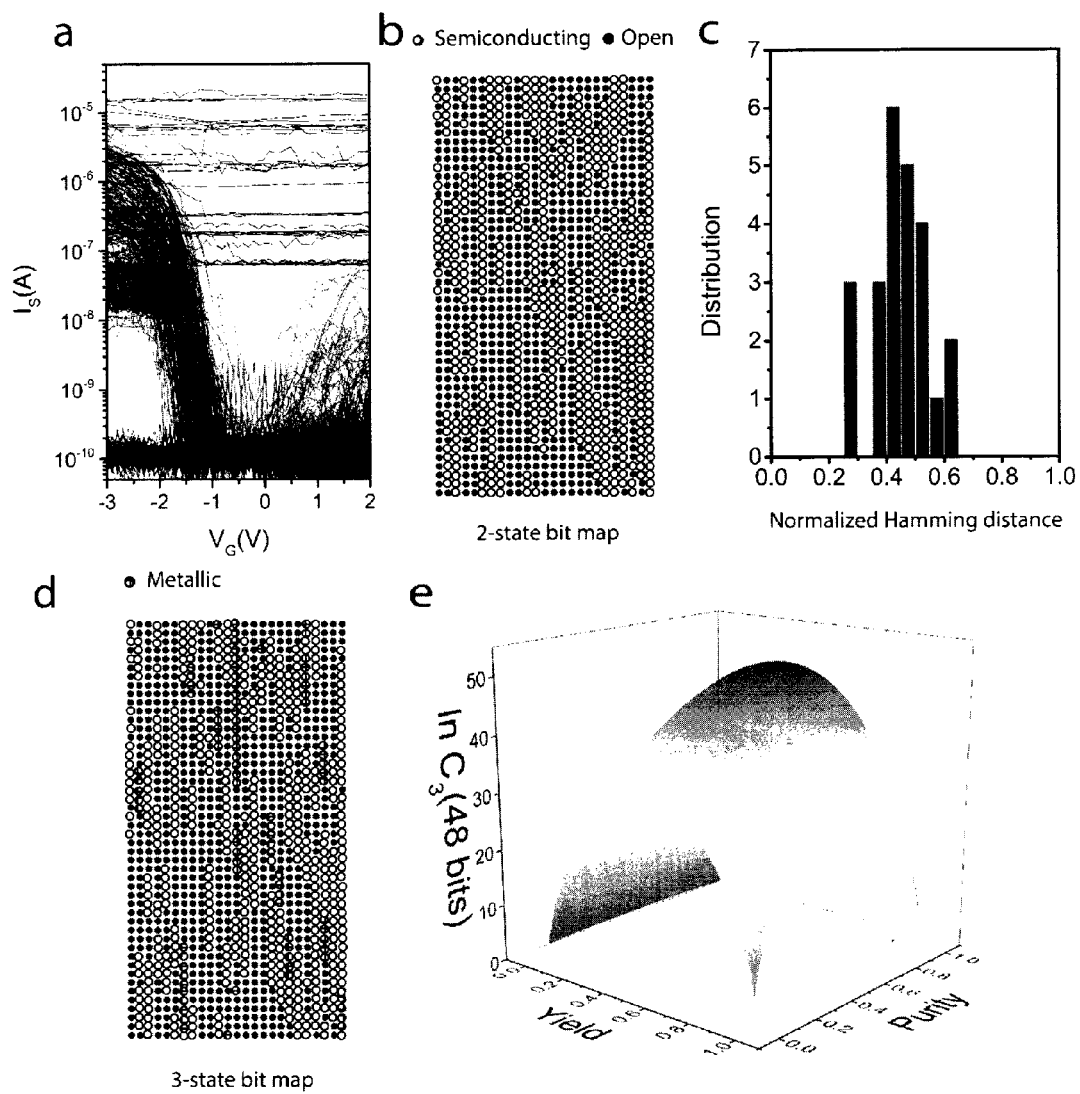
FIGS. 27a-e

US 9,787,473 B2

CARBON NANOTUBE ARRAY FOR CRYPTOGRAPHIC KEY GENERATION AND PROTECTION

CROSS-REFERENCE TO RELATED APPLICATION(S)

This application is a continuation of U.S. application Ser. No. 14/586,103 filed on Dec. 30, 2014, the disclosure of which is incorporated by reference herein.

FIELD OF THE INVENTION

The present invention relates to cryptographic key generation and protection and more particularly, to techniques for use of carbon nanotubes as an anti-tampering feature and for use of randomly metallic or semiconducting carbon nanotubes in the generation of a physically unclonable cryptographic key generation.

BACKGROUND OF THE INVENTION

A unique cryptographic key stored securely in the server is used to verify the authenticity of a chip (i.e., to determine whether a chip is real or fake). Specifically, during chip authentication the server uses the serial ID number of the chip to pull up the specific, unique key associated with that chip. The server then sends a randomly generated challenge question (e.g., some code) to the chip which the chip then encrypts and sends back to the server. The chip typically uses a universal encryption algorithm coupled with its unique key. The server then verifies the ID of the chip by decrypting the output from the chip using the key the server has associated with that chip ID. The server compares the decrypted challenge question with the original challenge question sent to the chip. Only if the two match can the chip be authenticated.

Protecting the key is one area of vulnerability in typical systems. For instance, as encryption/decryption is usually done by the application-specific integrated circuit (ASIC), cryptographic keys (unencrypted) often appear in data random access memory (RAM), registers and cache memory. All of these storage elements have transistors switching whenever a value of data is changed. Switching of transistors causes information leakage through various channels including power supply line and electromagnetic emission. Current consumption analysis can be accessed through direct probing of the circuit power line, which requires reverse-engineering of the chip.

It is also possible to direct access word line (WL)/bit line (BL) of cryptographic key arrays in the chip to steal the key by reverse-engineering. Once the key is stolen, hackers can duplicate unlimited number of chips and the chip authentication is compromised.

Furthermore, cryptographic keys based on charge-storing memories are usually vulnerable to Differential Power Analysis (DPA). For example, the current consumption difference before and after baking the chip at a high temperature (which shifts charge stored) can be easily used to estimate "1" and "0" in the key. Therefore, it is highly desirable to generate the random key using non charge-storing based technology.

Accordingly, techniques for cryptographic key generation and protection which are more robust against reverse-engineering and other procedures used to impermissibly obtain the key would be desirable.

SUMMARY OF THE INVENTION

The present invention provides techniques for use of carbon nanotubes as an anti-tampering feature and for use of randomly metallic or semiconducting carbon nanotubes in the generation of a physically unclonable cryptographic key generation. In one aspect of the invention, a cryptographic key having an anti-tampering feature is provided. The cryptographic key having the anti-tampering feature includes: an array of memory bits oriented along at least one bit line and at least one word line, wherein each of the memory bits comprises a memory cell, wherein the cryptographic key is stored in the memory cell, and wherein the memory cell is connected to the at least one bit line; and a metallic carbon nanotube interconnect which connects the memory cell to the at least one word line, wherein the metallic carbon nanotube interconnect is the anti-tampering feature which is configured to be removed during a reverse-engineering process and with it any connection between the memory cell and the at least one word line.

In another aspect of the invention, a cryptographic key is provided. The cryptographic key includes: an array of memory bits oriented along at least one bit line and at least one word line, wherein each of the memory bits has a selecting transistor having a source and a drain interconnected by a channel and a gate over the channel, wherein the gate is connected to the at least one word line, and wherein for at least one of the memory bits in the array the source is connected to the at least one bit line via either a metallic carbon nanotube or a semiconducting carbon nanotube.

In yet another aspect of the invention, a method for processing a cryptographic key is provided. The method includes the steps of: forming the cryptographic key which comprises an array of memory bits oriented along at least one bit line and at least one word line, wherein each of the memory bits comprises a selecting transistor having a source and a drain interconnected by a channel and a gate over the channel, wherein the gate is connected to the at least one word line, and wherein for at least one of the memory bits in the array the source is connected to the at least one bit line via either a metallic carbon nanotube or a semiconducting carbon nanotube; reading an output state of each of the memory bits; and storing the output state of each of the memory bits in a server.

A more complete understanding of the present invention, as well as further features and advantages of the present invention, will be obtained by reference to the following detailed description and drawings.

BRIEF DESCRIPTION OF THE DRAWINGS

FIG. 20$a$ is a diagram illustrating information read out from an exemplary carbon nanotube array cryptographic key in each of three different scenarios: a) open bits, b) bits containing a semiconducting carbon nanotube, and c) bits containing a metallic carbon nanotube according to an embodiment of the present invention;

FIG. 20$b$ is a diagram illustrating the carbon nanotube bit output states for each of the three scenarios a) open bit, b) semiconducting carbon nanotube, and c) metallic carbon nanotube according to an embodiment of the present invention;

FIG. 21 is a diagram illustrating trench dimension (length/width) and attractive/repulsive forces acting on the negatively charged (SDS-wrapped) carbon nanotubes (CNT-SDS) by the positively charged NMPI and the negatively charged $SiO_2$ according to an embodiment of the present invention;

FIG. 22 is a diagram illustrating a two-dimensional (2D) wiring structure for obtaining measurements from the present random carbon nanotube array according to an embodiment of the present invention;

FIG. 23$b$ is a diagram illustrating surface potential near the patterned substrate surface with a trench width/barrier width of 80 nm/80 nm according to an embodiment of the present invention;

FIG. 23$c$ is a diagram illustrating an x-component electromagnetic force profile as a function of carbon nanotube position moving toward the trench surface with the geometry of FIG. 23$a$ and FIG. 23$b$ according to an embodiment of the present invention;

FIG. 23$d$ is a diagram illustrating the surface potential with off-centered carbon nanotubes with trench width/barrier width of 30 nm/30 nm according to an embodiment of the present invention;

FIG. 23$e$ is a diagram illustrating an x-component electromagnetic force profile as a function of carbon nanotube position moving in parallel with the patterned substrate surface according to an embodiment of the present invention;

FIG. 23$f$ is a diagram illustrating a y-component electromagnetic force profile as a function of carbon nanotube position moving in parallel with the patterned substrate surface according to an embodiment of the present invention;

FIG. 24 is a diagram illustrating the combination number of 2-state bits in $\log_e$ scale as a function of total bits number and the yield of connected bits according to an embodiment of the present invention;

FIG. 25a is a diagram illustrating the fabrication of a simplified two-dimensional array of self-assembled carbon nanotube devices according to an embodiment of the present invention;

FIG. 25b is a scanning electron microscopy (SEM) image of an exemplary 5×5 carbon nanotube crossbar structure according to an embodiment of the present invention;

FIG. 25c is an enlarged view of a region from FIG. 25b which shows both bit "0" (without a carbon nanotube connection) and bit "1" (with a carbon nanotube connection) according to an embodiment of the present invention;

FIG. 26a is an I-V curve from measurement of carbon nanotube arrays with a trench width of 70 nm according to an embodiment of the present invention;

FIG. 26b is an I-V curve from measurement of carbon nanotube arrays with a trench width of 80 nm according to an embodiment of the present invention;

FIG. 26c is an I-V curve from measurement of carbon nanotube arrays with a trench width of 90 nm according to an embodiment of the present invention;

FIG. 26d is an I-V curve from measurement of carbon nanotube arrays with a trench width of 200 nm according to an embodiment of the present invention;

FIG. 26e is an I-V curve from measurement of carbon nanotube arrays with a trench width of 300 nm according to an embodiment of the present invention;

FIG. 26f is a diagram illustrating quantitative yield of connected bits corresponding to FIGS. 26a-e according to an embodiment of the present invention;

FIG. 27a is an I-V curve of randomly generated carbon nanotube arrays with an 80 nm trench width according to an embodiment of the present invention;

FIG. 27b is a diagram illustrating 2-state 48×25 random bits generated from the device of FIG. 27a according to an embodiment of the present invention;

FIG. 27c is a diagram illustrating the normalized Hamming distance of the 48-bit key according to an embodiment of the present invention;

FIG. 27d is a diagram illustrating 3-state 48×25 random bits generated from the device of FIG. 27a according to an embodiment of the present invention;

FIG. 27e is a diagram illustrating the combination number of 3-state bits in $\log_e$ scale as a function of the yield of connected carbon nanotube devices and the purity of the semiconducting devices according to an embodiment of the present invention.

DETAILED DESCRIPTION OF PREFERRED EMBODIMENTS

Provided herein are techniques for cryptographic key generation and protection for chip authentication based on carbon nanotube technology. The cryptographic keys provided herein are more robust against reverse-engineering and other tactics used to impermissibly obtain the key.

Carbon Nanotube-Based Cryptographic Key Anti-Tampering Devices—

In a first exemplary embodiment of the present techniques, metallic carbon nanotube interconnects are employed as part of a cryptographic key anti-tampering device. In the example now presented, the metallic carbon nanotube forms part of a word line (WL) connection to a memory cell—wherein the cryptographic key is stored in the memory cell. The metallic carbon nanotube prevents any reverse-engineering to directly access any metal levels below the metallic carbon nanotube. Specifically, as will be described in detail below, with this exemplary configuration the word line signal will pass through higher metal levels and the short metallic carbon nanotube segment, and return to the memory cell. Attempts to reverse engineer by delayering the device will destroy the metallic carbon nanotube interconnect, and thereby the stored key will lose its connection and function. Namely, the way often employed to obtain a key via reverse engineering is to electrically measure each bit (1 or 0). In order to do so, a hacker has to remove the upper dielectric and metal levels (delayering) until he/she can electrically probe the lead. Such attempts would be thwarted by the present anti-tampering features.

Figure 1:
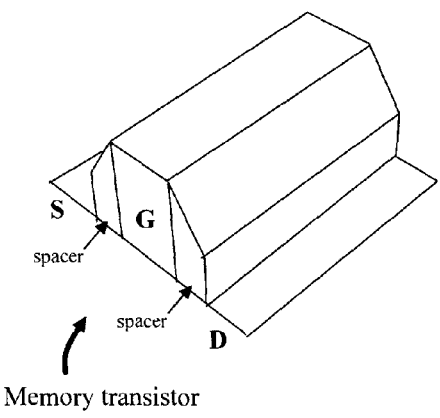
FIG. 1 is a diagram illustrating a starting structure for forming a cryptographic key having an anti-tampering feature according to the present techniques which generally includes any type of non-volatile memory cell, and in this particular example is a memory transistor having a source (S), a drain (D), and a gate (G) according to an embodiment of the present invention.

An exemplary process for forming a cryptographic key having a metallic carbon nanotube-based anti-tampering feature according to this exemplary embodiment is described by way of reference to FIGS. 1-5. As shown in FIG. 1, the process begins with the fabrication of a memory cell. It is notable that in the instant example, the memory cell is a standard memory transistor such as a floating-gate transistor. See FIG. 1. This, however, is merely an example meant to illustrate the present techniques. The anti-tampering features are broadly applicable to any non-volatile memory cell configurations wherein individual memory cells are accessed via a word line and a bit line. By way of example only, the instant memory cell could be a floating-gate transistor, a magnetic random access memory (MRAM) magnetic memory cell, a resistive random-access memory (RRAM) cell, a phase change memory (PCM) cell, a flash memory cell, an erasable programmable read only memory (EPROM) cell, etc.

In general, the carbon nanotube-based anti-tampering feature will be used to form an interconnect between the word line (or higher metal level) and the memory cell. What is important is that this carbon nanotube anti-tampering feature is destroyed (during the above-described delayering process) before the word line can be accessed.

The example illustrated in the figures uses a standard memory transistor such as a floating-gate transistor which includes a source (S) and a drain (D) interconnected by a channel, and a gate (G) over the channel which serves to regulate electron flow through the channel. Spacers are often used on opposite sides of the gate (G) to offset the gate (G) from the source (S) and the drain (D). See FIG. 1. As provided above, the present techniques are broadly applicable to any non-volatile memory cell configuration, e.g., floating-gate transistor, MRAM, RRAM, PCM, flash memory, EPROM, etc. wherein the memory cell is accessed via a word line and a bit line. One skilled in the art would know how these memory cell designs are configured in standard implementations having a word and bit line access. Here one is adding the present anti-tampering feature to those designs.

In the floating-gate transistor example, the transistor may be fabricated using standard processing techniques including, but not limited to, defining an active area of the memory cell in a wafer, gate (G) material deposition and patterning, spacer formation, source (S) and drain (D) implantation, etc. The process for fabricating a transistor on a wafer would be apparent to one skilled in the art, and thus is not described further herein. It is noted that for ease and clarity of depiction, the wafer (substrate upon which the memory transistor is constructed) is not shown. However, any suitable semiconductor wafer configuration may be employed including, but not limited to, a bulk semiconductor wafer, a semiconductor-on-insulator (SOI) wafer, etc.

In this exemplary embodiment, conventional key storage technology is employed in the sense that the key is stored in the memory cell (e.g., in this example—in the memory transistor). Advantageously, however, the present techniques introduce a unique metallic carbon nanotube-based anti-reverse engineering feature. As will be described in detail below, when this metallic carbon nanotube-based anti-reverse engineering feature is destroyed during a delayering process aimed to extract the key, the stored key will lose its connection and function. By contrast, in another exemplary embodiment provided below, carbon nanotube-based technology is used to physically create the cryptographic key itself, i.e., randomly deposited metallic or semiconducting carbon nanotubes become the key.

As provided above, the memory cell is accessed via a word line (WL) and a bit line (BL), wherein an intersection of the word line and the bit line is the address of the memory cell. In the instant example of a floating-gate transistor as the memory cell, the word line contacts the gate (G) of the transistor. Thus, as will be described in detail below, this provides an ideal location for implementation of the metallic carbon nanotube anti-tampering feature since delayering reverse engineering efforts (which deconstruct the device layer-by-layer typically from the top down) will remove the metallic carbon nanotube and thereby the stored key will lose its gate connection and function. As would be apparent to one skilled in the art, other memory cell configurations which do not have a gate-to-word line connection still provide the opportunity to insert the present anti-tampering feature in a metal layer above the word line (such that upon delayering—by the time the word line is accessed the connection to the word line is removed). By way of example only, in the case of MRAM, each magnetic memory cell is accessed via a word line and a bit line running above and below (or alternatively below and above) the memory cell. See, for example, U.S. Pat. No. 7,433,225 issued to Daniel C. Worledge, entitled "Scalable magnetic random access memory device," the contents of which are incorporated by reference as if fully set forth herein. Thus, the implementation of MRAM as opposed to a memory transistor would provide the same word line connection to the memory cell (or other higher metal layer) into which the present carbon nanotube interconnect-based anti-tampering feature could be placed. Thus, while the description that follows highlights an implementation involving a memory transistor one skilled in the art could apply this teaching to place the present anti-tampering feature in the metal layers accessing any type of non-volatile memory cell.

Figure 2:
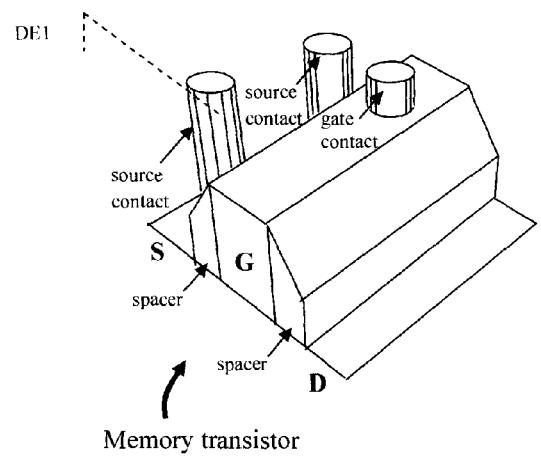
FIG. 2 is a diagram illustrating contacts having been formed to the source (S) and drain (D) of the memory transistor according to an embodiment of the present invention.

The process for forming the word and bit lines to include the metallic carbon nanotube anti-tampering feature will now be described. Specifically, as shown in FIG. 2, the next step in the process is to form contacts to the source (S), drain (D), and gate (G). It is notable that in this depiction, the drain (D) contact is not being shown as it would be constructed along with the adjacent memory transistor, however the same process described would be applied to form the drain (D) contact.

In this example, the source (S), drain (D), and gate (G) contacts consist of metal (or other electrically conductive material)-filled vias that connect the memory transistor to a first metal layer (M1). As is known in the art, the process for forming source (S), drain (D), and gate (G) contacts involves depositing a dielectric material (DE1) (such as silicon dioxide ($SiO_2$)) over the memory transistor, patterning vias in the dielectric material (DE1), and then filling the vias with a conductive material such as a metal or metals. For ease and clarity of depiction, a simple dotted line is being used to schematically represent the placement of the dielectric material (DE1) with the understanding that the configuration of such a standard interlayer dielectric would be apparent to one skilled in the art.

Figure 3:
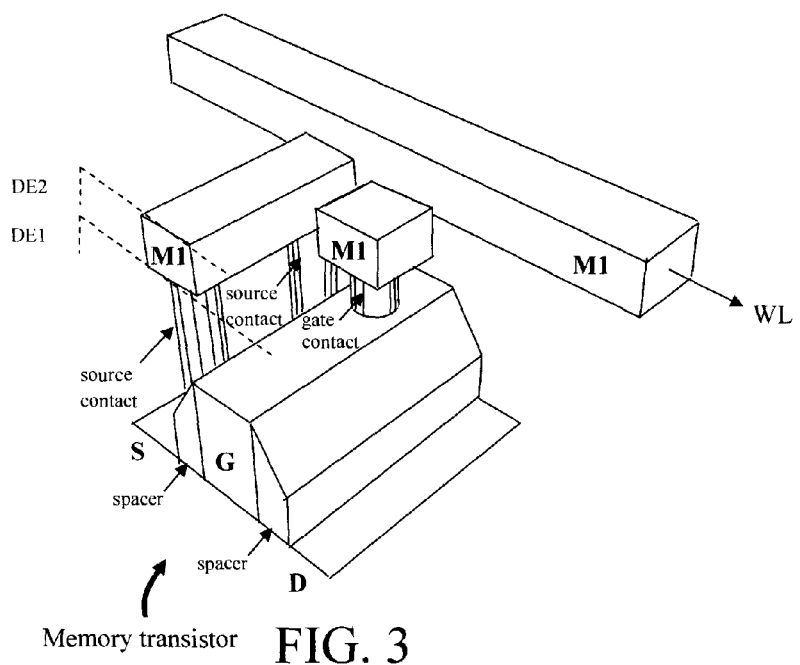
FIG. 3 is a diagram illustrating M1 metal lines having been formed contacting the source (S) and gate (G) contacts, wherein a word line (WL) is formed as part of the M1 metal layer according to an embodiment of the present invention.

Next, a M1 metal layer is formed contacting the source (S) and gate (G) contacts. See FIG. 3. As shown in FIG. 3, the corresponding word line (WL) is formed as part of the M1 metal layer. The M1 metal layer can be formed using a standard damascene metallization process wherein a dielectric material (DE2) (such as $SiO_2$) is first deposited, covering the source (S) and gate (G) contacts. For ease and clarity of depiction, a simple dotted line is being used to schematically represent the placement of the dielectric material (DE2) with the understanding that the configuration of such a standard interlayer dielectric would be apparent to one skilled in the art. Standard lithography and etching techniques can then be used to pattern the dielectric material (DE2) with the footprint and location of the M1 metal lines, including the word line (WL). The pattern is then filled with a conductive material such as metal(s) (e.g., copper) to form the M1 metal lines.

M1-M2 interconnects are then formed which will serve to interconnect the M1 metal layer with an M2 metal layer (see below). See FIG. 4. According to an exemplary embodiment, the M1-M2 interconnects consist of metal (or other electrically conductive material)-filled vias. Thus, the same process as described above for forming the source (S), drain (D), and gate (G) contacts may also be employed for forming the M1-M2 interconnects wherein, for example, a dielectric material (DE3) (such as $SiO_2$) is deposited over the memory cell, vias are patterned in the dielectric material (DE3), and then the vias are filled with a conductive material such as a metal or metals. For ease and clarity of depiction, a simple dotted line is being used to schematically represent the placement of the dielectric material (DE3) with the understanding that the configuration of such a standard interlayer dielectric would be apparent to one skilled in the art.

Figure 5:
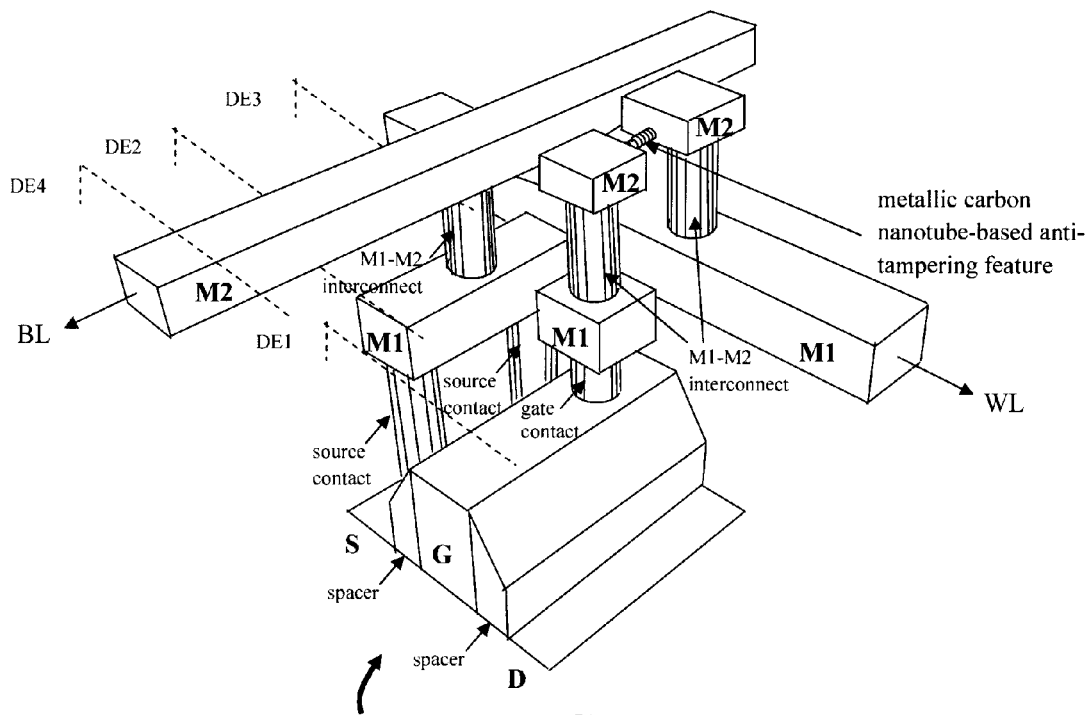
FIG. 5 is a diagram illustrating an M2 metal layer having been formed wherein a bit line (BL) and a metallic carbon nanotube-based anti-tampering feature is formed as part of the M2 (or higher) metal layer so as to ensure that the anti-tampering feature will be destroyed before the word line can be accessed during reverse-engineering efforts according to an embodiment of the present invention.

Finally, an M2 metal layer is formed. See FIG. 5. As shown in FIG. 5, the corresponding bit line (BL) is formed as part of the M2 metal layer, as is the metallic carbon nanotube-based anti-tampering feature (see below). As with the M1 metal layer, the M2 metal layer can be formed using a standard damascene metallization process wherein a dielectric material (DE4) (such as $SiO_2$ and/or hafnium oxide ($HfO_2$)—see below) is first deposited, covering the M1-M2 interconnects. Thus, as will be apparent from the following description, the M1 metal layer is separated from the M2 metal layer by dielectric, namely the DE3 and DE4 dielectric layers. By way of example only, an exemplary process for depositing a metallic carbon nanotube (which serves as the present interconnect/anti-tampering feature) by way of a self-assembly process is provided below whereby a trench is formed in the dielectric (i.e., in this case in the DE4 dielectric layer) and the carbon nanotube is placed selectively in the trench. This exemplary technique is however only one of a number of different possible techniques that may be employed to place the present carbon nanotube-based anti-tampering feature—see below. Standard lithography and etching techniques can then be used to pattern the dielectric material (DE4) with the footprint and location of the M2 metal lines, including the bit line (BL). The pattern is then filled with a conductive material such as metal(s)

(e.g., copper) to form the M2 metal lines. If the exemplary techniques described below for self-assembling the carbon nanotube interconnect are employed, then it is at this point in the process that a trench is formed in the dielectric material (DE4) into which the metallic carbon nanotube is deposited/placed which will serve as an interconnect/anti-tampering feature. It is however noted that any suitable process for placing a carbon nanotube may be used in accordance with the present techniques.

As highlighted above, with a conventional memory bit the word line (WL) is connected directly to the gate (G). By contrast, in accordance with the present techniques, the metallic carbon nanotube-based anti-tampering feature is inserted between the word line (WL) and the gate (G). Carbon nanotubes are small and thus cannot be easily detected without advanced imaging techniques such as a scanning electron microscope (SEM). Thus, if one were to attempt to reverse-engineer the present device by polishing down the bit layer-by-layer (i.e., a delayering process), by the time the word line (WL) is reached there will be no visible connection between the word line (WL) and the gate since the metallic carbon nanotube interconnect will have to be removed before one even reaches the word line (WL).

It is notable that, as highlighted above, the carbon nanotube used in this example is a metallic carbon nanotube. Carbon nanotubes, as produced, will naturally contain both semiconducting and metallic carbon nanotubes. For use as an interconnect, a metallic carbon nanotube is needed. Techniques are known in the art for separating metallic from semiconducting carbon nanotubes which may be implemented in accordance with the present techniques. See, for example, Tulevski et al., "High Purity Isolation and Quantification of Semiconducting Carbon Nanotubes via Column Chromatography," ASC Nano, vol. 7, no. 4, pgs. 2971-2976 (March 2013) (hereinafter "Tulevski"), the contents of which are incorporated by reference as if fully set forth herein. Using the techniques described in Tulevski, sorted samples of metallic carbon nanotubes can be obtained (see, for example, FIG. 1 of Tulevski).

The structure shown in FIG. 5 represents a single memory bit. Many memory applications employ an array of memory bits oriented along the word and bit lines. As would be apparent to one skilled in the art, the techniques described in conjunction with the description of FIGS. 1-5 above could be implemented in the same manner described to produce an array of interconnected memory bits, such as in FIG. 5A. FIG. 5A shows an array of memory bits formed according to the process illustrated in FIGS. 1-5 wherein each of the memory bits has the metallic carbon nanotube-based anti-tampering feature between the word line and the gate. FIG. 5A depicts, for illustrative purposes only, two memory bits along a given word line and two memory bits along a given bit line merely to exemplify how the memory bits are configured in an array. As would be apparent to one skilled in the art, more memory bits would likely exist than what is shown.

The general implementation of the metallic carbon nanotube interconnect anti-tampering feature was described above. Now provided is an exemplary technique that might be implemented in accordance with the present techniques to selectively place the present metallic carbon nanotube interconnect within the M2 metal layer. In general, any technique used for the selective placement of a metallic carbon nanotube(s), in a specified position for use as an interconnect may be employed in accordance with the present techniques. For instance, metallic carbon nanotubes can be simply cast from an aqueous solution (for example using a spin-coating process) to place the present metallic carbon nanotube interconnect. A mask may be employed to ensure proper placement. By way of example only, according to one non-limiting exemplary embodiment, chemical self-assembly techniques are used as described, for example, in Park et al. "High-density integration of carbon nanotubes via chemical self-assembly," Nature Nanotechnology, 7, 787-791 (October 2012) (hereinafter "Park"), the contents of which are incorporated by reference as if fully set forth herein. As described in Park, selective placement can be achieved based on ion exchange between a functional surface monolayer and surfactant-wrapped carbon nanotubes which are processed in an aqueous solution. Specifically, a surface monolayer is formed from 4-(N-hydroxycarboxamido)-1-methylpyridinium iodide (NMPI) which contains hydroxamic acid end groups that are known to self-assemble on metal oxide surfaces (such as $HfO_2$) but not on $SiO_2$. The functionalized surface can then be contacted with an aqueous solution of surfactant-wrapped carbon nanotubes whereby the anion of the NMPI is exchanged with the anionic surfactant wrapped around the carbon nanotubes leading to a strong coulombic attraction between the negatively charged surfactant and the positively charged monolayer. As a result, self-assembly of the carbon nanotubes can be achieved on the $HfO_2$ surfaces selective to the $SiO_2$ surfaces. An exemplary application of this process described in Park to the present techniques is now described by way of reference to FIGS. 6-13.

Figure 4:
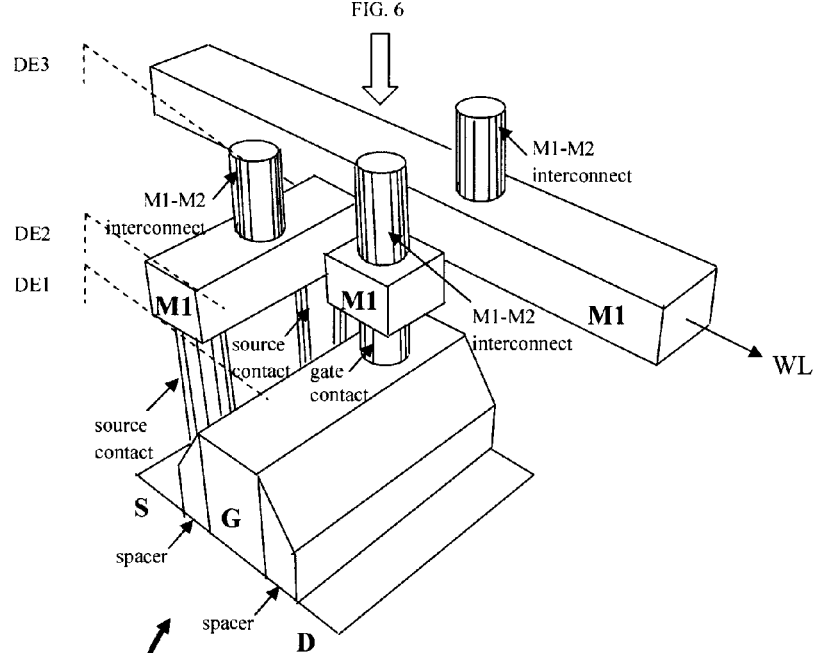
FIG. 4 is a diagram illustrating M1-M2 interconnects having been formed to interconnect the M1 metal layer with an M2 metal layer according to an embodiment of the present invention.
Figure 5A:
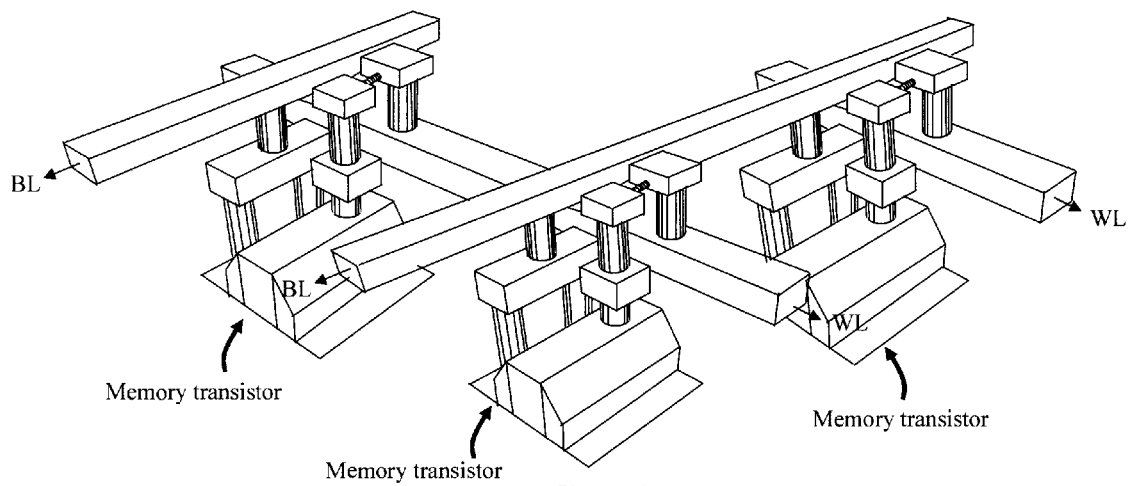
FIG. 5A is a diagram illustrating an array of memory cells formed according to the process illustrated in FIGS. 1-5 wherein each of the memory cells has the metallic carbon nanotube-based anti-tampering feature between the word line and the gate according to an embodiment of the present invention.
Figure 6:
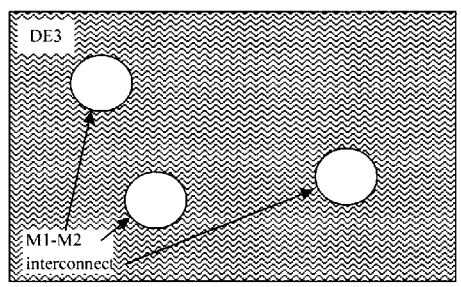
FIG. 6 is a top-down view of the structure of FIG. 4 illustrating the M1-M2 interconnects having been formed in the dielectric material (DE3) according to an embodiment of the present invention.
Figure 7:
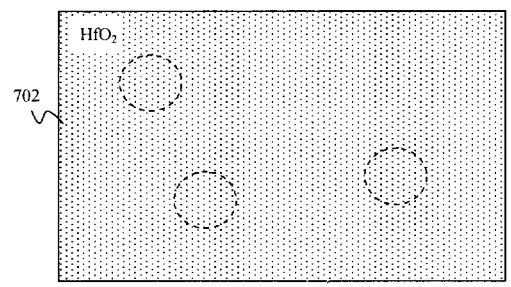
FIG. 7 is a top-down diagram illustrating one exemplary non-limiting approach for selectively placing the metallic carbon nanotube interconnect wherein a hafnium oxide ($HfO_2$) layer, the first layer of a bilayer dielectric, is deposited onto the dielectric material (DE3) covering the M1-M2 interconnects according to an embodiment of the present invention.
Figure 8:
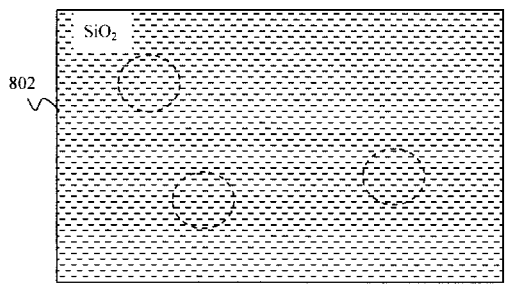
FIG. 8 is a top-down diagram illustrating a silicon dioxide ($SiO_2$) layer, the second layer of a bilayer dielectric, having been deposited onto the $HfO_2$ layer according to an embodiment of the present invention.

Since the placement of the metallic carbon nanotube interconnect occurs (according to this example) during the formation of the M2 metal layer (see above), the description starts at FIG. 6 with the structure illustrated in FIG. 4—after the formation of the M1-M2 interconnects in the dielectric material (DE3). The perspective of the figures now shifts however to the top-down view referenced in FIG. 4. See FIG. 6. In order to be able to achieve selective placement of the metallic carbon nanotube interconnect using the process described in Park, a bilayer dielectric is next deposited onto the dielectric material (DE3) covering the M1-M2 interconnects, i.e., the dielectric material DE4 in this example will be made up a $HfO_2/SiO_2$ bilayer. See FIGS. 7 and 8. Specifically, as shown in FIG. 7 the first layer of the bilayer dielectric is a $HfO_2$ layer 702 deposited onto the dielectric material (DE3) covering the M1-M2 interconnects. Next, as shown in FIG. 8, the second layer of the bilayer dielectric is a $SiO_2$ layer 802 deposited onto the $HfO_2$ layer 702.

Figure 9:
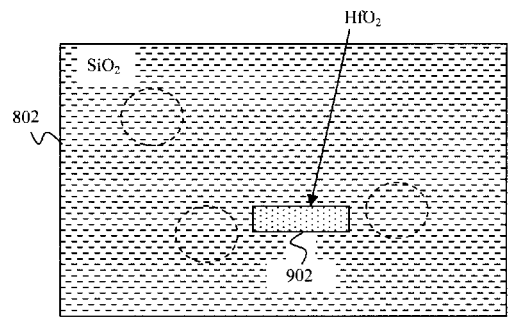
FIG. 9 is a top-down diagram illustrating a trench having been formed, in the $SiO_2$ layer which corresponds to the location of the metallic carbon nanotube interconnect according to an embodiment of the present invention.
Figure 10:
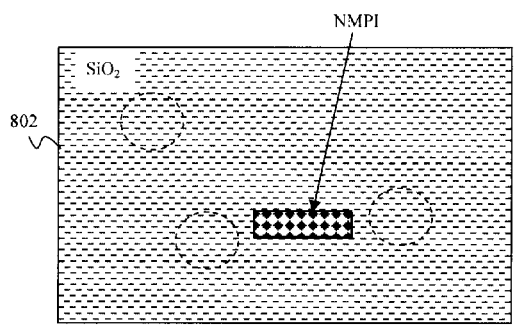
FIG. 10 is a top-down diagram illustrating a self-assembled 4-(N-hydroxycarboxamido)-1-methylpyridinium iodide (NMPI) monolayer having been formed within the trench according to an embodiment of the present invention.
Figure 11:
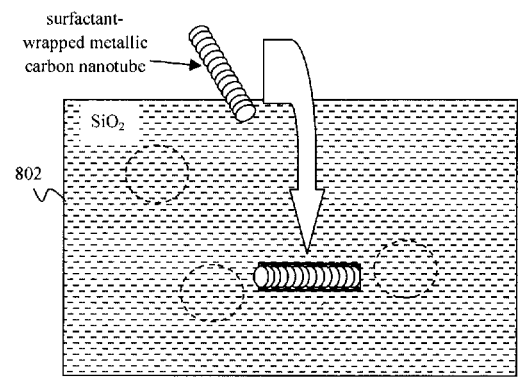
FIG. 11 is a top-down diagram illustrating one or more surfactant-wrapped metallic carbon nanotube(s) self-assembled on the NMPI monolayer which form the metallic carbon nanotube interconnect according to an embodiment of the present invention.

The metallic carbon nanotube interconnect is then placed followed by formation of the M2 metal lines. Specifically, as mentioned above, the metallic carbon nanotube interconnect is placed (selectively) within a trench formed in the dielectric. Specifically, standard lithography and etching can be used to form a trench 902 in the $SiO_2$ layer 802. See FIG. 9. The trench 902 corresponds to the location of the metallic carbon nanotube interconnect. In this case however, a selective etch process is used to etch the trench 902 through only $SiO_2$ layer 802 of the bilayer dielectric. The result, as shown in FIG. 9 is the exposure of $HfO_2$ layer 702 within the trench 902. Using the above-described process of Park, a self-assembled monolayer of NMPI is then formed. As provided above, due to its hydroxamic acid end groups NMPI will self-assemble on metal oxide surfaces (in this case $HfO_2$) but not on $SiO_2$. Accordingly, the NMPI monolayer will form only within the trench 902. See FIG. 10.

An aqueous solution of surfactant-wrapped metallic carbon nanotubes is prepared. According to an exemplary embodiment, the carbon nanotubes are wrapped by a surface-active dispersing agent, such as sodium dodecylsulfate (SDS). Wrapping the carbon nanotubes in the surfactant allows the carbon nanotubes to be dispersed in water forming the aqueous solution. Column chromatography is then used to isolate the metallic carbon nanotubes according to the process described in Tulevski. Excess SDS can be removed by dialysis to obtain a high carbon nanotube deposition yield. The aqueous solution of the surfactant-wrapped metallic carbon nanotubes is then contacted with the NMPI surface. See FIG. 11. The negative iodide ion of the NMPI monolayer is exchanged with the positive sodium ion of the SDS to form sodium iodide, resulting in a strong Coulombic attraction between the positively charged (NMPI) monolayer and the negatively charged surfactant. Thus, the metallic carbon nanotube(s) will adhere only to the NMPI surface. By way of this self-assembly process, the carbon nanotube deposition on NMPI is facilitated by the attached SDS, as well as being deterred by free SDS surfactant blocking NMPI sites. Thus, the yield of nanotube placement can be controlled by tuning the concentration of free SDS surfactant, as well as controlling the salt concentration which controls Debye length in the solution as the ionic strength, and/or the dimension of the trench 902 (see below). For instance, by changing the ionic strength by adjusting the salt concentration, one can control the electrostatic interaction in the solution and thereby control the carbon nanotube placement. Tailoring the dimensions of the trenches to control carbon nanotube placement is described below. It is notable that in this case, 100% yield of (metallic carbon nanotubes) in the trenches is desired in this anti-tampering feature embodiment since the carbon nanotubes serve as interconnects.

Figure 12:
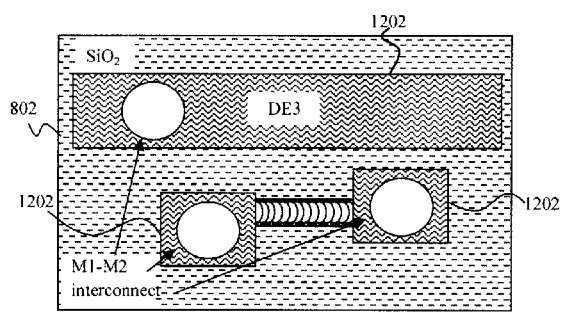
FIG. 12 is a top-down diagram illustrating a pattern for the M2 metal layer having been formed in the bilayer dielectric according to an embodiment of the present invention.
Figure 13:
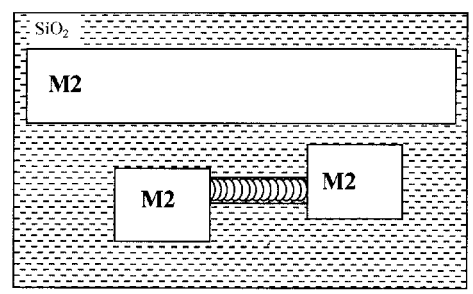
FIG. 13 is a top-down diagram illustrating the trenches having been filled with a conductive material forming the M2 metal lines according to an embodiment of the present invention.
Figure 14:
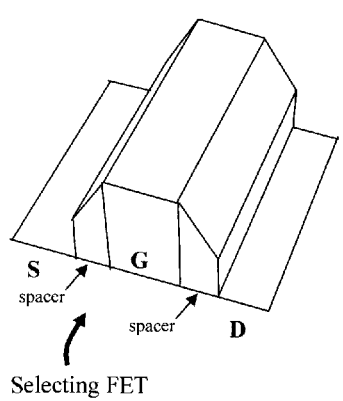
FIG. 14 is a diagram illustrating a starting structure for forming a physically unclonable cryptographic key based on self-assembled carbon nanotubes according to the present techniques which includes a selecting field effect transistor (FET) having a source (S), a drain (D), and a gate (G) according to an embodiment of the present invention.

The M2 metal lines can then be formed in contact with the metallic carbon nanotube interconnect and with the underlying M1-M2 interconnects. Specifically, standard lithography and etching can be used to form a pattern 1202 for the M2 metal layer in the bilayer dielectric. See FIG. 12. As shown in FIG. 12, the pattern 1202 extends through both the $SiO_2$ layer 802 and the $HfO_2$ layer 702, thus exposing the underlying dielectric material (DE3) and the M1-M2 interconnects. This will enable the M2 metal lines (which will be formed in the trenches—see below) to contact the M1-M2 interconnects.

The pattern 1202 is then filled with a conductive material such as a metal (e.g., copper)—forming the M2 metal lines. See FIG. 13. Excess metal can be removed using a mechanical etching process such as grinding.

The above-described configuration wherein the metallic carbon nanotube interconnecting the word line (WL) and the gate is placed in the M3 metal layer is ideal in terms of reverse-engineering proofing the circuit. Namely, when delayering the circuit from the top down (it is common to remove layers one by one starting from the top) by the time the word line (WL) is reached there will be no visible connection to the gate. It is notable that other configurations are however possible. For instance, in accordance with the present techniques, a metallic carbon nanotube interconnect may instead (or in addition to) be placed in one or more higher metal levels (so long as the carbon nanotube anti-tampering feature is destroyed (during reverse-engineering efforts) before the word line is revealed—thereby removing any connection between the memory cell and the word line. Redundancy can increase the degree of protection. The same process described above for selectively placing metallic carbon nanotube(s) can be applied to any layer in the circuit. For example, a ($HfO_2/SiO_2$) bilayer dielectric can be employed for any of the dielectric layers (DE1-4) thus enabling selective carbon nanotube placement via the self-assembly process in Park. See above.

Physically Unclonable Cryptographic Keys Based on Self-Assembled Carbon Nanotubes—

In the embodiments described thus far, only the use of metallic carbon nanotubes has been desirable as their conductivity is necessary to form an interconnect. As provided above, however, as-synthesized carbon nanotubes contain both metallic and semiconducting carbon nanotubes. Specifically, due to different chiralities about ⅓ of carbon nanotubes exhibit metallic behaviors, and about ⅔ show semiconducting behaviors. Apart from their very different conductance, these two types of carbon nanotubes are basically indistinguishable from one another. Advantageously, provided herein are techniques that leverage this randomly varying conductance property of carbon nanotubes to create physically unclonable cryptographic keys.

Specifically, the key is generated during fabrication of the circuit by depositing randomly either metallic or semiconducting carbon nanotubes. Thus, the randomness of the deposited carbon nanotubes (as either semiconducting or metallic) is the "key" itself. As will be described in detail below, once the key is generated during fabrication of the circuit it can be read from the chip and stored by the server. By comparison, in the embodiment described in conjunction with the description of FIGS. 1-5 above, conventional key storage techniques are employed wherein the key is stored in a memory cell. The (metallic) carbon nanotube interconnects in that case are used as an anti-tampering feature such that when delayering is used to reverse-engineer the circuit the metallic carbon nanotube interconnect is destroyed and with it the stored key gate connection (and function).

The same chemical self-assembly process as described above is used to selectively place the carbon nanotubes. Here however the use of both metallic and semiconducting carbon nanotubes adds a level of randomness to the process based on the inherent physical disorder of the chemical self-assembly process. Such randomness is desirable for cryptographic key generation since it makes reverse-engineering the key impossible, even if one were to know the exact process by which it was made. Another level of randomness is provided based on the width of the trenches into which the carbon nanotubes are deposited. By varying the trench width, the possibility of a carbon nanotube being deposited into the trench can be controlled. For instance, a larger trench width increases the chance that a carbon nanotube is deposited into the trench. Conversely, a smaller trench width can reduce the chance of carbon nanotube deposition. Therefore, each bit in a carbon nanotube cryptographic key can be metallic, semiconducting, or no-tube. This process provides a low-cost and hard-to-forge approach for implementing physical security primitives.

As compared to the above approach wherein carbon nanotube-based anti-tampering techniques are implemented in a conventional cryptographic key configuration, inherent physical disorder is now being leveraged as a hardware roots-of-trust cryptographic key. Hardware roots-of-trust cryptographic keys are described, for example, in Tehranipoor et al., "Introduction to Hardware Security and Trust," Springer: New York, N.Y., 2012 (hereinafter "Tehranipoor"), the contents of which are incorporated by reference as if fully set forth herein. Physical one-way functions are described, for example, in Pappu et al., "Physical One-Way Functions," Science, vol. 297, pgs. 2026-2030 (September 2002) (hereinafter "Pappu"), the contents of which are incorporated by reference as if fully set forth herein. As described in Pappu, a unique speckle pattern can be generated when shining a laser through an optical epoxy token with inhomogeneous scatters. The format of the physical unclonable function (PUF) was later expanded from non-electronic devices to integrated circuit-based electronic devices. See, for example, Gassend et al., "Silicon Physical Random Functions," Proceedings of the 9$^{th}$ ACM conference on Computer and communications security CCS '02, pgs. 148-160 (November 2002) (hereinafter "Gassend"), and Maes et al., "Physically Unclonable Functions: A Study on the State of the Art and Future Research Directions," Towards Hardware-Intrinsic Security, Information Security and Cryptography 2010, pp. 3-37 (October 2010), the contents of each of which are incorporated by reference as if fully set forth herein. All silicon PUFs exploit local mismatches between different circuit components. As a major component, metal-oxide-semiconductor field effect transistors (MOSFET) are subjected to the mismatches from random dopant fluctuation in the channel, line edge roughness and polysilicon/high-K granularity. The mismatches arising from these stochastic atomic variations are likely to follow a Gaussian distribution, in which a large portion of the mismatches are very close to zero mean. PUFs based on these small mismatches can be easily disturbed by noises and environmental factors which can lead to large bit error rates in the output. Thus pre-processing, to rule out devices with small mismatches or post-processing to reduce the bit error rate is required in silicon PUFs. For example, ring oscillator or arbiter PUFs, are based on mismatches of two or multiple delay chains, which are subject to the averaging effect of mismatches in multiple stages. See, for example, S. S. Mansouri et al., "Ring Oscillator Physical Unclonable Function with Multi Level Supply Voltages," 2012 IEEE 30$^{th}$ International Conference on Computer Design (ICCD), pgs. 520-521 (September/October-2012) (ring oscillator), the contents of which are incorporated by reference as if fully set forth herein, and Gassend (arbiter PUFs).

However, these traditional complementary metal-oxide-semiconductor (CMOS) based security primitives not only require large amounts of dedicated logic circuits, area, and power, but they also require high accuracy measurements utilizing high frequency clocks and high resolution timing. See, for example, Beckmann et al., "Hardware-Based Public-Key Cryptography with Public Physically Unclonable Functions," Lecture Notes in Computer Science, vol. 5806, pp. 206-220 (2009), the contents of which are incorporated by reference as if fully set forth herein. Nanotechnology enables conceptually new security primitives which are potentially more robust and tamper-resistant than CMOS based security primitives. See, for example, Rose et al., "Hardware Security Strategies Exploiting Nanoelectronic Circuits," 2013 18$^{th}$ Asia and South Pacific Design Automation Conference (ASP-DAC), pp. 368-372 (January 2013), and Rose et al., "Nanoelectronics and Hardware Security," Network Science and Cybersecurity, Advances in Information Security, vol. 55, pp. 105-123 (2014), the contents of each of which are incorporated by reference as if fully set forth herein. Most of the existing functional nanomaterials exploit their unique optical properties for anti-counterfeiting applications, either by information encryption or naturally occurring randomness. See, for example, B. Yoon et al., "Recent functional material based approaches to prevent and detect counterfeiting," J. Mater. Chem. C, 1, 2388-2403 (January 2013) (information encryption), Demirok et al., "Orthogonal Multi-Readout Identification of Alloy Nanowire Barcodes," J. AM. CHEM. SOC. 131, 22-23 (December 2008) (naturally occurring randomness), and Kim et al., "Anti-counterfeit nanoscale fingerprints based on randomly distributed nanowires," Nanotechnology 25, 155303 (March 2014) (naturally occurring randomness), the contents of each of which are incorporated by reference as if fully set forth herein. For the ease of integration into a system, particularly for the on-chip security, electronic devices with easy access are more favorable. However, currently only few examples exist, such as the memristor-based PUF which possesses merits of high density and non-volatility but requires SET-RESET steps. See, for example, Rajendran et al., "Nano-PPUF: A Memristor-Based Security Primitive," 2013 IEEE Computer Society Annual Symposium on VLSI (ISVLSI), pp. 84-87 (August 2012), the contents of which are incorporated by reference as if fully set forth herein.

Provided herein is a non-volatile, low-cost PUF (also referred to herein as a "physically unclonable function") which is based on self-assembled carbon nanotubes. In general, the present physically unclonable cryptographic key includes an array of memory cells. Each of the memory cells represents a single bit. Thus, the terms "memory cell" and "bit" are used interchangeably herein. In the example described immediately below, each bit includes a selecting field effect transistor (FET) (or simply "selecting transistor"). For smaller arrays a selecting transistor may not be required, and such an example is provided below. In most cases however, with larger arrays selecting transistors are needed to access specific bits. Generally, the implementation of selecting transistors in a memory cell array should be apparent to one skilled in the art.

An exemplary methodology for fabricating the bits in the array is now provided by way of reference to FIGS. 14-18. What is shown and described in the following example makes reference to a single given one of the bits, with the understanding that the same process applies to producing the multiple bits that form the array (see, for example, FIG. 18A—described below). According to an exemplary embodiment, the bits in the array are identical to one another except for the carbon nanotube component which, due to the randomness of the self assembly process, is metallic and/or semiconducting.

The process begins by forming the selecting FET (one for each of the memory cells). See FIG. 14. A standard FET includes a source (S) and a drain (D) interconnected by a channel, and a gate (G) over the channel which serves to regulate electron flow through the channel. Spacers are often used on opposite sides of the gate (G) to offset the gate (G) from the source (S) and the drain (D) (see FIG. 14). The selecting FET may be fabricated using standard processing techniques including, but not limited to, defining an active area of the memory cell in a wafer, gate (G) material deposition and patterning, spacer formation, source (S) and drain (D) implantation, etc. The process for fabricating a transistor memory cell on a wafer would be apparent to one skilled in the art, and thus is not described in further detail herein. It is noted that for ease and clarity of depiction, the wafer (upon which the bit is constructed) is not shown. However, any suitable semiconductor wafer configuration may be employed including, but not limited to, a bulk semiconductor wafer, a semiconductor-on-insulator (SOI) wafer, etc.

Each bit is accessed via a word line (WL) and a bit line (BL), wherein an intersection of the word line and the bit line is the address of the bit. In most configurations, the word line contacts the gate (G) of the memory cell and the bit line contacts the source (S)/drain (D). Thus, it is through the bit lines which information is written to/read from the bits. As will be described in detail below, a carbon nanotube(s) is inserted in the bit line connection to the source/drain via the above-described self-assembly process which is randomly metallic or semiconducting. Additionally, by varying the width of the trenches into which the carbon nanotubes are deposited, some bits may receive no carbon nanotube at all, thus adding to the randomness of the key generation process.

Figure 15:
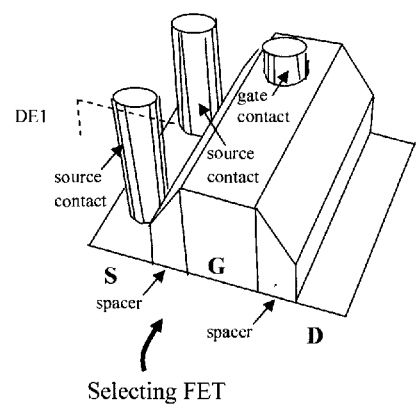
FIG. 15 is a diagram illustrating contacts having been formed to the source (S) and gate (G) of the selecting FET according to an embodiment of the present invention.

The process for forming the word and bit lines and the (metallic or semiconducting) carbon nanotube key will now be described. Specifically, as shown in FIG. 15, the next step in the process is to form contacts to the source (S), drain (D), and gate (G). It is notable that in this depiction, the drain (D) contact is not being shown as it would be constructed along with the adjacent bit, however the same process described would be applied to form the drain (D) contact.

In this example, the source (S), drain (D), and gate (G) contacts consist of metal (or other electrically conductive material)-filled vias that connect the selecting transistor to a first metal layer (M1). As is known in the art, the process for forming source (S), drain (D), and gate (G) contacts involves depositing a dielectric material (DE1) (such as $SiO_2$) over the selecting transistor, patterning vias in the dielectric material (DE1), and then filling the vias with a conductive material such as a metal or metals. For ease and clarity of depiction, a simple dotted line is being used to schematically represent the placement of the dielectric material (DE1) with the understanding that the configuration of such a standard interlayer dielectric would be apparent to one skilled in the art.

Figure 16:
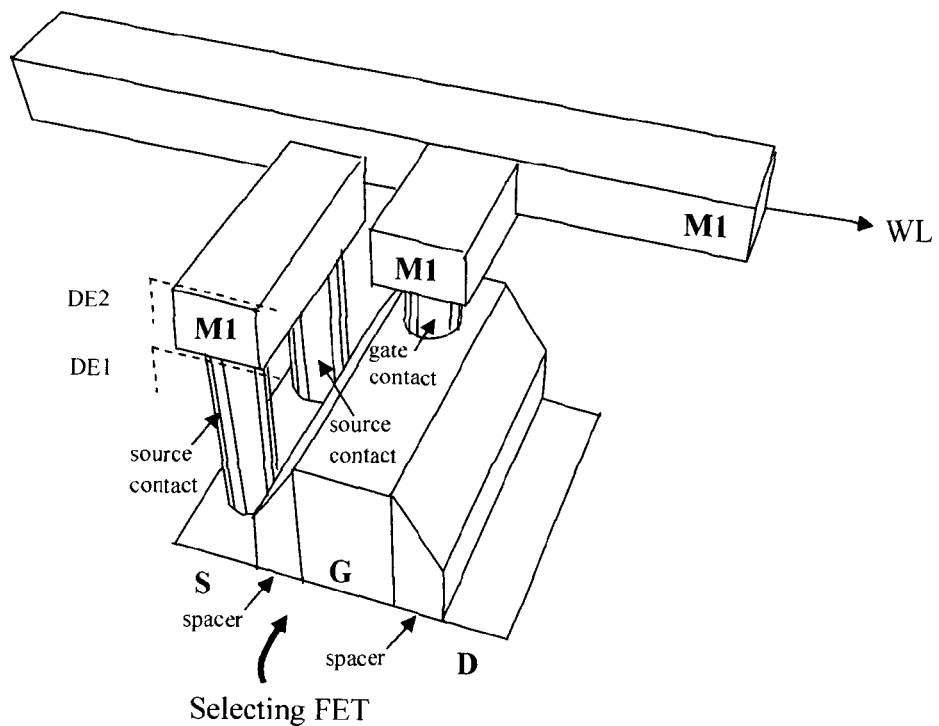
FIG. 16 is a diagram illustrating M1 metal lines having been formed contacting the source (S) and gate (G) contacts, wherein a word line (WL) is formed as part of the M1 metal layer according to an embodiment of the present invention.
Figure 17:
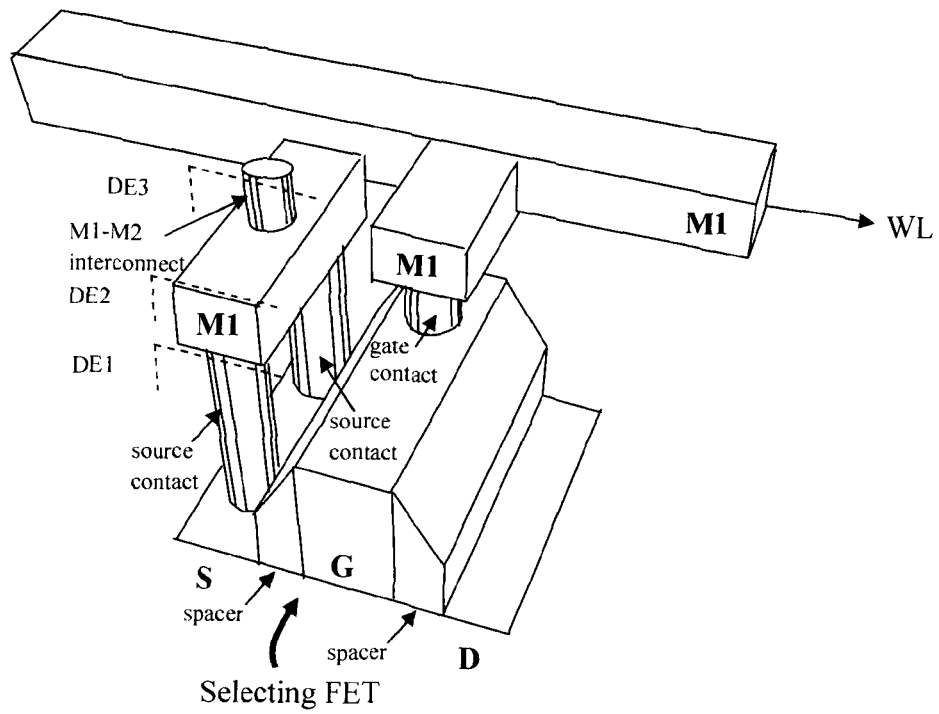
FIG. 17 is a diagram illustrating M1-M2 interconnect(s) having been formed to interconnect the M1 metal layer with an M2 metal layer according to an embodiment of the present invention.

Next, an M1 metal layer is formed contacting the source (S) and gate (G) contacts. See FIG. 16. As shown in FIG. 16, the corresponding word line (WL) is formed as part of the M1 metal layer. The M1 metal layer can be formed using a standard damascene metallization process wherein a dielectric material (DE2) (such as $SiO_2$) is first deposited, covering the source (S) and gate (G) contacts. For ease and clarity of depiction, a simple dotted line is being used to schematically represent the placement of the dielectric material (DE2) with the understanding that the configuration of such a standard interlayer dielectric would be apparent to one skilled in the art. Standard lithography and etching techniques can then be used to pattern the dielectric material (DE2) with the footprint and location of the M1 metal lines, including the word line (WL). The pattern is then filled with a conductive material such as metal(s) (e.g., copper) to form the M1 metal lines.

M1-M2 interconnects are then formed which will serve to interconnect the M1 metal layer with an M2 metal layer (see below). See FIG. 17. According to an exemplary embodiment, the M1-M2 interconnects consist of metal (or other electrically conductive material)-filled vias. Thus, the same process as described above for forming the source (S), drain (D), and gate (G) contacts may also be employed for forming the M1-M2 interconnects wherein, for example, a dielectric material (DE3) (such as $SiO_2$) is deposited over the memory cell, vias are patterned in the dielectric material (DE3), and then the vias are filled with a conductive material such as a metal or metals. For ease and clarity of depiction, a simple dotted line is being used to schematically represent the placement of the dielectric material (DE3) with the understanding that the configuration of such a standard interlayer dielectric would be apparent to one skilled in the art.

Figure 18:
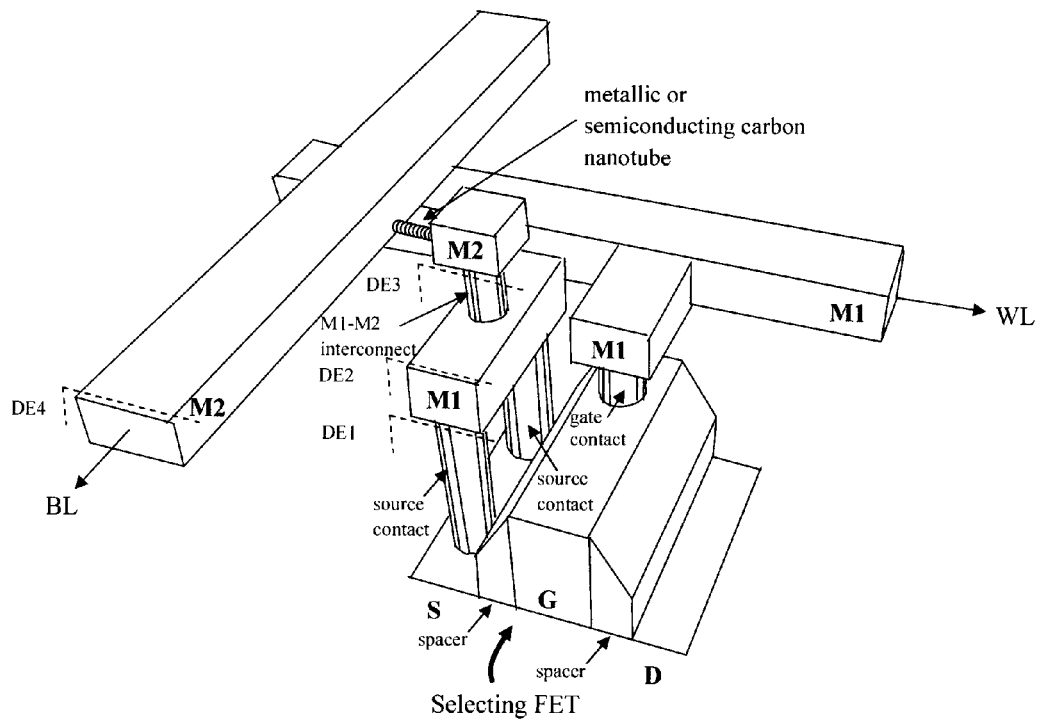
FIG. 18 is a diagram illustrating an M2 metal layer having been formed wherein a bit line (BL) and a (metallic or semiconducting) carbon nanotube "key" are formed as part of the M2 metal layer according to an embodiment of the present invention.

Finally, an M2 metal layer is formed. See FIG. 18. As with the M1 metal layer, the M2 metal layer can be formed using a standard damascene metallization process wherein a dielectric material (DE4) is first deposited, covering the M1-M2 interconnects. Thus, as will be apparent from the following description, the M1 metal layer is separated from the M2 metal layer by dielectric, namely the DE3 and DE4 dielectric layers. It is in the DE4 dielectric layer which a trench is formed to place a (randomly) metallic or semiconducting carbon nanotube which will serve to connect the bit line with the source of the selecting transistor—see below. Standard lithography and etching techniques can then be used to pattern the dielectric material (DE4) with the footprint and location of the M2 metal lines, including the bit line (BL). The pattern is then filled with a conductive material such as metal(s) (e.g., copper) to form the M2 metal lines. As shown in FIG. 18, a carbon nanotube(s) is/are placed in the M2 metal layer between the bit line and the source of the selecting transistor. Due to the self-assembly process employed, the carbon nanotube(s) is/are randomly metallic and/or semiconducting. As will be described in detail below, this randomness throughout the array constitutes the key.

In order to place the carbon nanotube(s) in the M2 metal layer, a trench is formed in the DE4 dielectric material. Based on the self-assembly process described for example in conjunction with the description of FIGS. 6-13, above, the DE4 dielectric material might be configured as a bilayer with a layer of $SiO_2$ over a layer of $HfO_2$. Accordingly, the trench can be formed in the $SiO_2$ top layer exposing the underlying $HfO_2$. A monolayer of NMPI may then be formed on the exposed $HfO_2$ via a self-assembly process.

An aqueous solution of SDS-wrapped carbon nanotubes is prepared. Excess SDS can be removed by dialysis to obtain a high carbon nanotube deposition yield. Based on the different chiralities of the carbon nanotubes as synthesized, the solution will contain both metallic and semiconducting carbon nanotubes. In this case, it is desirable to have both metallic and semiconducting carbon nanotubes since the randomness of placing either a metallic or semiconducting carbon nanotube in a given bit based on the self-assembly process contributes to the 'unclonability' of the key. Namely, by contacting the carbon nanotube solution with the NMPI coated surface the carbon nanotubes will self-assemble in the trenches (throughout the array) due to the strong Coulombic attraction between the positively charged (NMPI) monolayer and the negatively charged SDS (see above). Thus, even if one were to know the exact process by which the bits were created, the randomness of the (metallic and/or semiconducting) carbon nanotube placement makes reproducing the key impossible (i.e., unclonable). As will be described in detail below, in accordance with the present techniques, once created the key can be read out once and saved to the server.

Figure 18A:
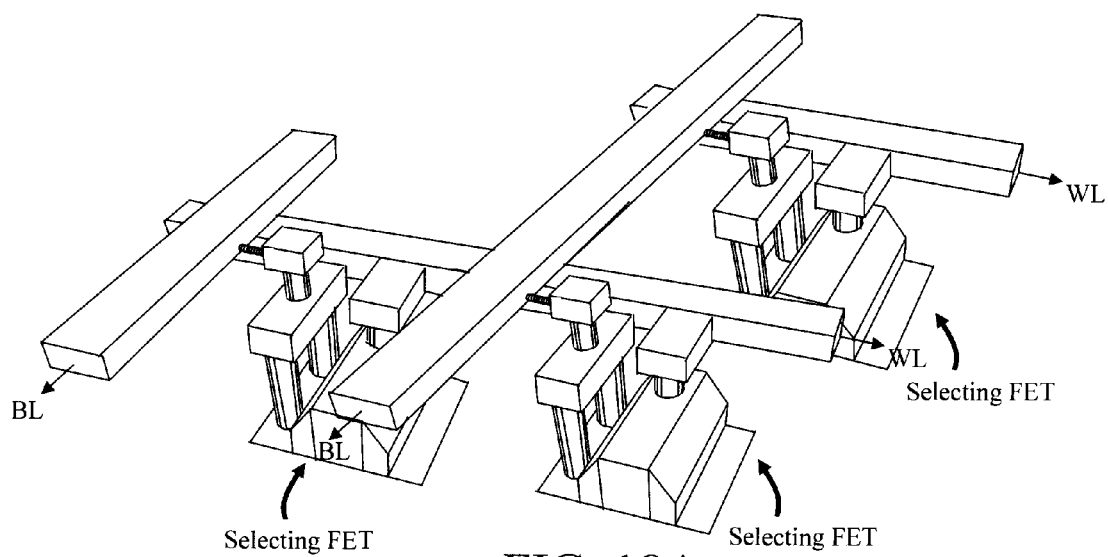
FIG. 18A is a diagram illustrating an array of bits formed according to the process illustrated in FIGS. 14-18 wherein each of the bits randomly has either a metallic or a semiconducting carbon nanotube between the bit line and the source/drain according to an embodiment of the present invention.

The structure shown in FIG. 18 represents a single bit. Many applications employ an array of bits oriented along the word and bit lines. As would be apparent to one skilled in the art, the techniques described in conjunction with the description of FIGS. 14-18 above could be implemented in the same manner described to produce an array of interconnected bits, such as in FIG. 18A. FIG. 18A is a diagram illustrating an array of bits formed according to the process illustrated in FIGS. 14-18 wherein each of the bits randomly has either a metallic or a semiconducting carbon nanotube between the bit line and the source/drain. FIG. 18A depicts, for illustrative purposes only, two bits along a given word line and two bits along a given bit line merely to exemplify how the memory bits are configured in an array. As would be apparent to one skilled in the art, more bits would likely exist than what is shown.

Figure 19:
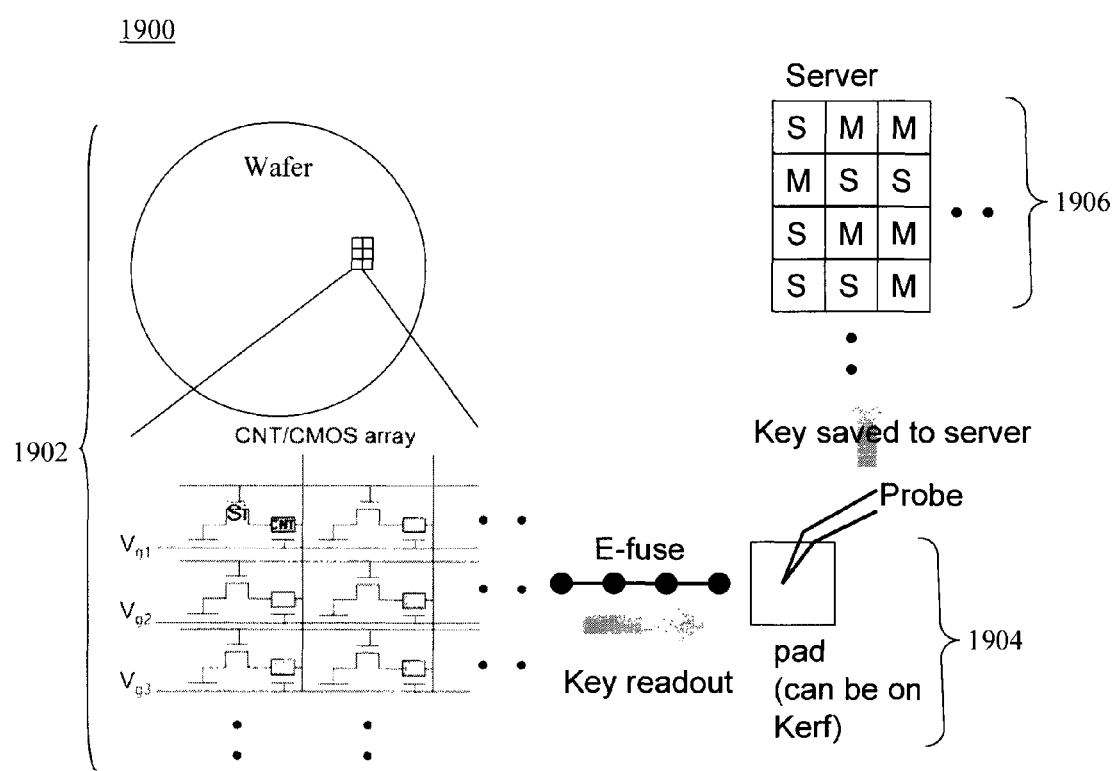
FIG. 19 is a diagram illustrating an exemplary methodology for processing the present carbon nanotube-based physically unclonable cryptographic key according to an embodiment of the present invention.

Once the key has been created, it can be read from the chip and stored in the server. FIG. 19 provides an exemplary methodology 1900 for processing the present carbon nanotube-based physically unclonable cryptographic key. In step 1902, the cryptographic key is created (according to the process illustrated in FIGS. 14-18 and described above) as an array of bits, each bit containing a self-assembled carbon nanotube that is randomly either metallic (M) or semiconducting (S) (i.e., CNT/CMOS array). The carbon nanotube in each bit is illustrated by a box labeled "CNT." In step 1904, the key is read from the chip. In the example depicted in FIG. 19, a plurality of chips is being produced on a given wafer. The regions or spaces between chips on a wafer are commonly known as the kerf. According to an exemplary embodiment, readout pads are provided on the kerf for each of the bits. A wafer probe can then be used in step 1904 to read out the key (i.e., the bit output states—see below) from each of the pads. Basically, as shown in FIG. 19, the 'key' will be whether the bit(s) has/have a metallic (M) or semiconducting (S) carbon nanotube which occurs randomly based on the above-described process. For instance in the example depicted in FIG. 19, the array of bits generates a unique combination of metallic (M) or semiconducting (S) carbon nanotube-containing bits. It is notable that it is also possible to have, based on the trench width engineering techniques provided herein, a third optional scenario where there is no carbon nanotube present in a bit. That condition is referred to herein as an open bit—see below.

For enhanced security, the readout pads can optionally be connected to the bits via electronic fuses (e-fuses). For a description of e-fuses, see for example, U.S. Pat. No. 8,189,419 issued to Chen et al., entitled "Apparatus for nonvolatile multi-programmable electronic fuse system," the contents of which are incorporated by reference as if fully set forth herein. Once the key readout has occurred in step 1904, the e-fuses can be blown which means that the key (the carbon nanotube array information) cannot be directly accessed anymore—the output of the key array can only enter the on-die encryption circuit. For a description of on-die encryption/decryption circuits see, for example, Krishnamurthy et al., "High-performance energy-efficient encryption in the sub-45 nm CMOS era," 2011 $48^{th}$ ACM/EDAC/IEEE Design Automation Conference (DAC) (June 2011), the contents of which are incorporated by reference as if fully set forth herein.

Finally, in step 1906 the key readout from the chip is stored to the server. As shown in FIG. 19, the key consists of a unique combination of (randomly, generated) metallic (M) and semiconducting (S) carbon nanotube-containing bits. Later, the key stored in the server can be used to authenticate the chip. Advantageously, even if the exact procedure used to generate the present carbon nanotube-based key is known the key cannot be reproduced (reverse-engineered) due to the random self-assembly process used to place the carbon nanotubes.

FIG. 20a is a diagram illustrating information read out (as per methodology 1900) from an exemplary carbon nanotube array cryptographic key according to the present techniques. Specifically, in FIG. 20a gate voltage $V_g$ is plotted on the x-axis and drain current $I_D$ is plotted on the y-axis. FIG. 20a illustrates the three scenarios randomly possible for any given bit in the array, a) the bit contains no carbon nanotube—i.e., it is an open bit, b) the bit contains a semiconducting (S) carbon nanotube, and c) the bit contains a metallic carbon nanotube. The output in the case of an open bit simply represents noise. As described above and in detail below, the width of the trench into which the carbon nanotube is deposited can be modulated to control the probability of a carbon nanotube being present within the trench. FIG. 20b is a diagram illustrating the carbon nanotube bit output states for each of the three scenarios a) open bit, b) semiconducting carbon nanotube, and c) metallic carbon nanotube.

As provided above, the dimensions of the trenches can be varied to further increase the randomness of the key. By way of example only, a trench width can be chosen (i.e., the same width will be used for all the trenches on a given chip) that provides about a 50% chance that a carbon nanotube will be deposited inside the trench. Since as will be described in detail this placement process is based on both attractive and repulsive forces acting on the carbon nanotube, the placement process is also random (one cannot control which trenches will eventually have a carbon nanotube) and thus tailoring the trench width in this manner can create additional randomness. For instance, as will be described in detail below, reducing the trench width increases the interaction between the $SiO_2$ sidewalls of the trench and the surfactant-wrapped carbon nanotubes, both of which are negatively charged—generating repulsive forces. Reducing the trench width can thus lead to the absence of carbon nanotubes in one or more of the bits. See, for example, FIG. 21 which illustrates the concept of trench dimension (length/width) and attractive/repulsive forces acting on the negatively charged (SDS-wrapped) carbon nanotubes (CNT-SDS) by the positively charged NMPI and the negatively charged $SiO_2$. It is notable that, in accordance with the present techniques, the patterned $SiO_2/HfO_2$ surface can be configured as shown here in FIG. 21 (wherein the $SiO_2$ fills in trenches in the $HfO_2$ layer leaving $HfO_2$ surfaces in between on which the NMPI monolayer can be formed) and/or as shown in FIG. 1a of Park (wherein the trenches are formed in the $SiO_2$ top layer thereby exposing the underlying $HfO_2$ surfaces on which the NMPI monolayer can be formed). It is the latter configuration which is shown illustrated in FIGS. 6-13.

Thus, the width of patterned $HfO_2$ trenches can be varied, if so desired, to achieve random placement of the carbon nanotubes. This concept can be illustrated by the following non-limiting example—by reducing the trench width from about 300 nanometers (nm) to about 70 nm, the repulsive force between negatively charged $SiO_2$ sidewall and negatively charged SDS wrapping around the carbon nanotube (SDS-CNT) becomes more prominent compared to the attractive force between the NMPI monolayer and the SDS-CNT. By carefully designing the trench dimension, this competition between the attractive force and the repulsive force can lead to highly random CNT placement inside the trench, see FIG. 21. If the width of a trench is reduced enough, e.g., below 70 nm, then a carbon nanotube will not assemble in the trench. This technique can be used to further increase the randomness throughout the array, namely within each trench there is either a carbon nanotube or no carbon nanotube and, if there is a carbon nanotube present it is either metallic or semiconducting. According to an exemplary embodiment, the trenches are configured to have a height which is relatively larger than the dimension of the carbon nanotubes—for example a height of from about 5 nm to about 10 nm, and ranges therebetween, e.g., about 7 nm. As shown in FIG. 21, the height of the trench is measured from the surface of the $HfO_2$ to the top surface of the $SiO_2$ (the NMPI is a monolayer and has almost no thickness).

As shown in FIG. 21, the result of the present self-assembly process is a random array of carbon nanotubes. Of course, what is shown in FIG. 21 is a simplified version of the array which in production would include word and bit lines and preferably a selecting transistor for each bit. See, for example, FIGS. 14-18, described above. Measurements from the random carbon nanotube array may be obtained using a two-dimensional (2D) wiring structure as shown in FIG. 22. In order to rule out the current contributions from other current loops, a similar measurement technique for measuring a memory array can be used. Namely, only the input row of the device under test is biased while all other pads are connected to ground, and the current is measured at the corresponding column of output. FIG. 22 shows how the connected (black) and disconnected (white) bits are distributed in a 5×5 two-dimensional array. The array size can be significantly expanded when incorporating row and column multiplexers commonly used in memory arrays, thus more random bits can be generated for higher security requirements.

There are several potential approaches for harvesting the inherent randomness of self-assembled carbon nanotube bits. By setting different threshold current, a unique distribution can be obtained for each current level. A ring oscillator or an arbiter (see, for example, Suh et al., "Physical unclonable functions for device authentication and secret key generation," Proceedings of the 44$^{th}$ annual Design Automation Conference DAC '07, pgs. 9-14 (June 2007), the contents of which are incorporated by reference as if fully set forth herein) can also be built using carbon nanotubes instead of silicon to make lower power devices. These approaches however require sophisticated engineering control of carbon nanotubes and the fabrication process. A simpler and reliable method involves determining the connection type of nanotube devices. Given the stability of CNTs over a long period of time (see, for example, Shahrjerdi et al., "High-Performance Air-Stable n-Type Carbon Nanotube Transistors with Erbium Contacts," ACS Nano, 2013, 7(9), pp. 8303-8308 (September 2013), the contents of which are incorporated by reference as if fully set forth herein) and a large noise margin between connected and disconnected devices, this approach provides exceptional repeatability.

To understand the trench-width dependent carbon nanotube placement behavior, numerical calculations (see below) may be made based on a multiphysics model including electrostatics and ionic transport. A description of the multiphysics model is now provided.

Figure 23:
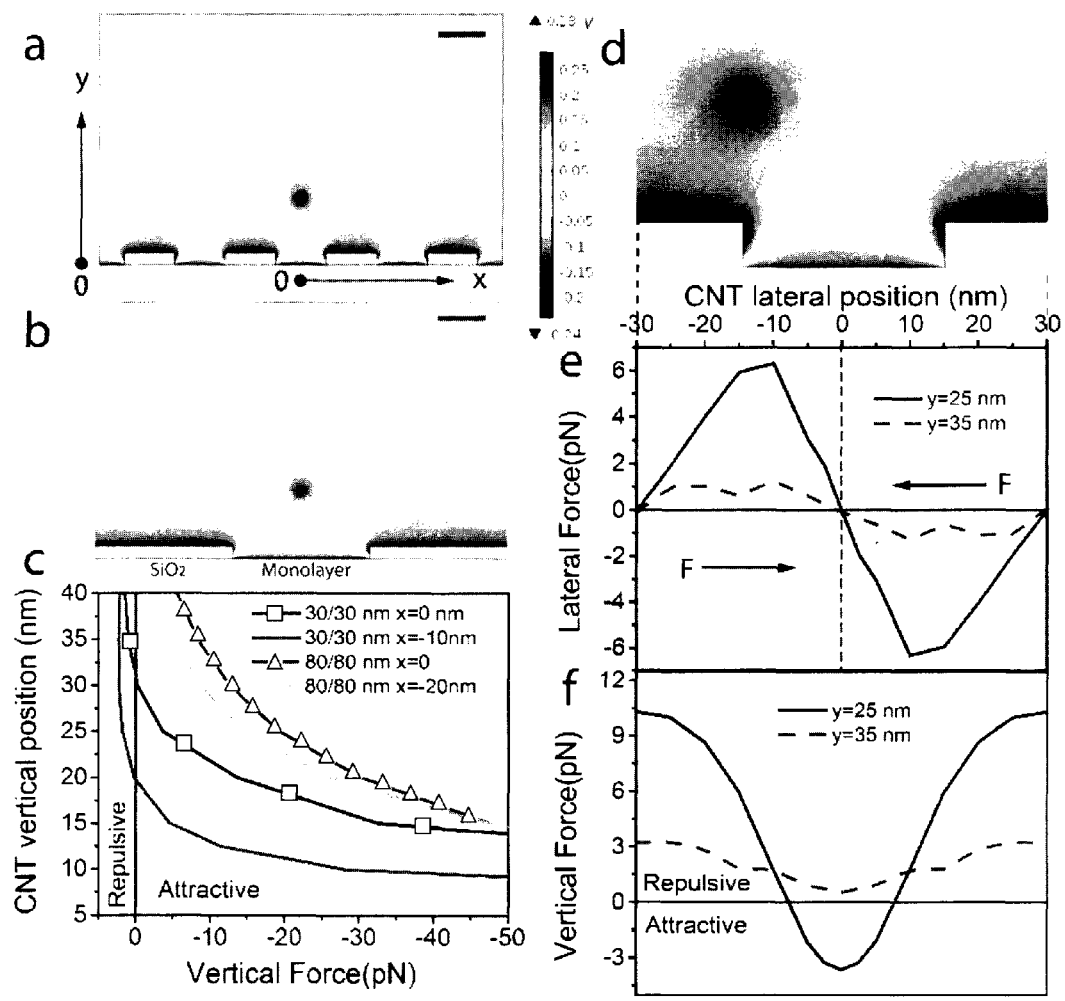
FIG. 23$a$ is a diagram illustrating surface potential near a patterned $SiO_2$ and NMPI (monolayer) substrate surface with a trench width/barrier width of 30 nanometers (nm)/30 nm according to an embodiment of the present invention.

Simulation—a simulation of the interaction between SDS-wrapped carbon nanotubes and the charged surface was carried out using COMSOL Multiphysics® Modeling Software based on finite element methods. The structure is shown in FIGS. 23a and 23b, in which the out-of-plane length of the carbon nanotube and pattern is 500 nm. Surface charge density of the SDS-wrapped carbon nanotube, SiO$_2$ and NMPI on HfO$_2$ used in the simulation is −0.05, −0.49 and 0.1 coulomb per square centimeter (C/cm$^2$), respectively. The salt concentration is 0.1 millimolar (mM).

FIGS. 23a-f illustrate the surface charge effects of a patterned SiO$_2$ and NMPI (monolayer) substrate surface on SDS-wrapped carbon nanotube assembly. Specifically, FIG. 23a shows the surface potential near a patterned SiO$_2$ and NMPI (monolayer) substrate surface with a trench width/barrier width of 30 nanometers (nm)/30 nm. FIG. 23b shows the surface potential near the patterned substrate surface with a trench width/barrier width of 80 nm/80 nm. FIG. 23c illustrates an x-component electromagnetic force profile as a function of carbon nanotube position moving toward the trench surface with the geometry of FIG. 23a and FIG. 23b. FIG. 23d shows the surface potential with off-centered carbon nanotubes with trench width/barrier width of 30 nm/30 nm. FIG. 23e illustrates an x-component electromagnetic force profile as a function of carbon nanotube position moving in parallel with the surface. FIG. 23f illustrates a y-component electromagnetic force profile as a function of carbon nanotube position moving in parallel with the surface. FIG. 23a and FIG. 23b have the same coordinate axis and scale (scale bar: 30 nm). The shaded bar shown to the right of FIG. 23a applies to FIG. 23a, FIG. 23b, and FIG. 23d.

The possible combination number—in an array with a total device number of n, the possible combination number $C_2(n,m)$ of connected devices (m) and open devices (n−m) is given by the combination:

$$C_2(n, m) = \frac{n!}{(n-m)!m!} \quad (1)$$

In order to evaluate the dependence of $C_2(n,m)$ on m and n, Stirling's approximation given by:

$$\ln(n!) \approx n \ln(n) - n \quad (2)$$

is applied, and it is assumed that m=αn α∈(0,1]. The simplified form of the combination equation can be represented by:

$$\ln(C_2(n,m)) \approx -n[(1-\alpha)\ln(1-\alpha)+\alpha \ln(\alpha)] = -n\gamma(\alpha). \quad (3)$$

By taking a derivative of function γ(α), the minimum value of γ(α)=−0.6931 can be calculated when α=0.5. And the function ln $C_2(n,m)$ is symmetric about axis of α=0.5, as shown in FIG. 24. FIG. 24 is a diagram illustrating the combination number of 2-state bits in log$_e$ scale as a function of total bits number and the yield of connected bits.

Based on this multiphysics model, the following numerical calculations are used to analyze the trench-width dependent carbon nanotube placement behavior:

(4) Poisson equation describes the electric potential based on charge distribution:

$$-\in_0 \nabla \cdot [\in(x)\nabla \Psi(x)] = \rho(x) = e_0 N_A \Sigma_{i=1}^{Ni} Z_i c_i(x). \quad (4)$$

wherein, $\Psi(x)$ is the electric potential, $\rho(x)$ is the net charge density, $\in_0$ is the vacuum permittivity and $\in(x)$ is the dielectric constant of the solution. $c_i(x)$ and $Z_i$ denote the molar concentration and valence of the i$^{th}$ ionic species respectively.

(5) Nernst-Planck equation describes the ion motion in the solution:

$$J_i(x) = c_i(x)v(x) - D_i \nabla c_i(x) - \mu_i c_i(x) \nabla \Psi(x). \quad (5)$$

The diffusion coefficient $D_i$ is related to the mobility $\mu_i$ via Einstein relation, $\mu_i = Z_i e_0 D_i / K_B T$. $v(x)$ is the velocity field of the fluid. The equation is solved under steady state, where $\nabla \cdot J_i(x) = 0$.

Although the interaction between a carbon nanotube and the substrate surface can be a complicated three-dimensional problem, it can be simplified by using a two-dimensional simulation by assuming that the carbon nanotube is always parallel to the elongated direction of the trench. This is a reasonable assumption since the minimum energy state occurs when the carbon nanotube locates near the center of the trench, as will be shown below. Therefore, the carbon nanotube will be forced to align along the elongated direction of the trench as long as the trench has a high length-to-width aspect ratio. Two geometries with trench width/barrier width of 30 nm/30 nm and 80 nm/80 nm were simulated and the resulting electric potential maps are plotted in FIGS. 23a and 23b, respectively. Electrical double layers (EDLs) are formed on the negatively charged SDS-wrapped carbon nanotube, SiO$_2$ barrier surfaces, and positively charged monolayer modified HfO$_2$ surface. At the starting position (x=0 nm, y=40 nm) simulated, EDLs are slightly overlapping. When the carbon nanotube moves toward the HfO$_2$ surface along the y-direction, the overlap increases, and for the 30 nm/30 nm trench/barrier geometry, the overall electromagnetic force in y-direction starts to switch from being repulsive (positive force) to being attractive (negative force) at y=30 nm, as shown in FIG. 23c. Repeating the same analysis with a shifted starting position (x=−10 nm, y=40 nm), the carbon nanotube has to be within 20 nm from the HfO$_2$ surface to be attracted toward the surface, as also shown in FIG. 23c. On the other hand, for the 80 nm/80 nm geometry, the carbon nanotube always experiences overall attractive force from surfaces based on the similar simulation shown in FIG. 23c. Thus diffusion of the SDS-wrapped carbon nanotube from bulk solution toward the surface is energetically unfavorable for the geometry with a small trench width because of net repulsive force from the patterned surface.

To show that the carbon nanotube aligns along the elongated direction of the placement trench, the case when moving the carbon nanotube in parallel with the surface at a fixed separation was also simulated. An electric potential map of the 30 nm/30 nm geometry with CNT position at (x=−15 nm, y=25 nm) is shown in FIG. 23d where the periodic boundary condition is applied. The EDLs of the carbon nanotube, SiO$_2$ and monolayer are significantly overlapped, indicating a strong interaction. This interaction leads to a lateral force (FIG. 23e) tending to move the carbon nanotube to the center of the trench and this force decays as the separation from the surface increases. Meanwhile, the carbon nanotube experiences a vertical force with strength and polarity strongly depending on the carbon nanotube's position. At y=35 nm, the vertical force is small and repulsive for all the x coordinates, while at y=25 nm a window of attractive force of about 20 nm opens up near the center of the trench. Only if the carbon nanotube has the chance to get into that window, the carbon nanotube can reach the trench surface. The width of this placement window can be well controlled by the trench width, providing the design parameter to control CNT placement yield (to ~50% for the highest randomness).

As provided above, for larger arrays it is preferable that each of the bits in the array has a selecting FET. The FETs enable accurate selection of any given bit in the array. If the array is small enough, however, it is possible to construct bits without a selecting FET. An example of a simplified small array of bits that do not include selecting FETs is shown in FIGS. 25a-c. In this case, bits are accessed by selecting the word and bit lines in the array that intersect at the corresponding bit. Namely, FIG. 25a demonstrates the fabrication of this simplified two-dimensional array of self-assembled carbon nanotube devices and FIG. 25b shows a scanning electron microscopy (SEM) image of a 5×5 carbon nanotube crossbar structure.

According to an exemplary embodiment, this two-dimensional array of carbon nanotube devices is fabricated by the following process. Carbon nanotubes are first deposited using the above-described chemical self-assembly method. In this example, trenches with different dimensions are patterned on an HfO$_2$ blanket film, followed by 7 nm thick SiO$_2$ evaporation and a lift-off process. Electron-beam lithography is used to define all the patterns mentioned here, either in poly(methyl methacrylate) (PMMA) or hydrogen silsesquioxane (HSQ). Right before self-assembly of the NMPI monolayer, the substrate is cleaned in oxygen plasma (0.3 torr, 5 minutes). The patterned substrate is then immersed in a 3.5 mM solution of NMPI (3:1 ethanol/water) for 1 hour, followed by rinsing with ethanol to complete the NMPI monolayer coating. Several drops of nanotube solution are put down on top of the substrate and covered with a thin glass slide. After nanotube deposition for 1 hour, the substrate is rinsed with deionized (DI) water for 30 seconds and sonicated in DI water for 1 minute. The carbon nanotubes can be patterned by reactive ion etch (RIE) in oxygen using double layers of PMMA and HSQ as a etch mask. The HSQ layer is removed by lifting off underlying PMMA layer in hot acetone. The substrate is then thermal annealed at 400 degrees Celsius (° C.) in vacuum of 1×10$^{-7}$ torr to drive off the monolayer and SDS to recover the electrical properties of CNTs. The first metal layer (0.5 nm titanium (Ti)/20 nm palladium (Pd)/10 nm gold (Au)) is fabricated using a lift-off process as source and drain electrodes. 2% HSQ is patterned as an insulating layer between two metal layers. The second metal layer (0.5 nm Ti/20 nm Pd/30 nm Au) is then patterned as wires and pads. The completed device can be annealed at 150° C. in hexamethyldisilazane (HMDS) ambient for 40 minutes to improve device performance. The highly doped silicon substrate serves as a backgate.

FIG. 25c presents an enlarged view of the region from FIG. 25b within the hatched box, which shows both bit "0" (without a carbon nanotube connection—on the left) and bit "1" (with a carbon nanotube connection—on the right). Due to the extremely small body size of carbon nanotubes, the area consumption of the carbon nanotube device is only limited by metal leads and contacts. This two-dimensional array structure enables high-density integration of carbon nanotubes by largely reducing lead and pad numbers. All of the carbon nanotubes in different trench widths were electrically examined in order to analyze the width dependent self-assembly behavior.

FIGS. 26a-e show the semilogarithmic current-voltage (I-V) curves from the measurement of CNT arrays with different trench widths (i.e., 70 nm, 80 nm, 90 nm, 200 nm, and 300 nm, respectively) which illustrates the trench-width dependent self-assembly behavior of the carbon nanotubes. FIG. 26f shows quantitative yield of connected bits corresponding to FIGS. 26a-e. The yield scales with the trench width for both 1500 nm and 2000 nm trench lengths, with a transition from 70-100 nm and saturation beyond 150 nm, which is attributed to the abovementioned competition between the attractive force and the repelling force. A higher density of nanotube placement was observed with more cycles of dialysis (not shown), suggesting fewer free SDS surfactants competing with SDS-wrapped carbon nanotubes. The saturation behavior is the transition from reaction limited process to diffusion limited process, where carbon nanotube placement yield is no longer limited by the repelling force from SiO$_2$ sidewalls, but starts to be limited by the required time for carbon nanotubes to diffuse near HfO$_2$ trenches in solution. A time dependent placement study is required to understand this behavior.

For an array of a given size, the number of connected units ("1") and disconnected units ("0") should be equal in order to achieve the maximum combination randomness (see above). Therefore, according to an exemplary embodiment, the trench width of 80 nm is chosen for its ability to realize a connection yield close to 50%. By way of example only, FIG. 27a shows the I-V curves of 1200 devices, all with 80 nm trench width. In FIG. 27a, white dots are connecting devices and black dots are open devices. A threshold current of 2 nanoamperes (nA) at a gate voltage of −3 V was set to determine the connection type of each bit, and a 48×25

2-state random bits map is constructed as shown in FIG. 27b. For the statistical study, a reasonable key size of 48 bits was selecting for calculating the Hamming distance. The Hamming distance is calculated by comparing bit-to-bit difference between two keys. The distribution of the normalized Hamming distance of 48-bit keys is found to be centered at 0.5 with a boundary of 0.25 to 0.65, as shown in FIG. 27c. That means any two different keys generated based on this technology differ in at least 12 bits which is 25% of the 48-bit key.

Synthesized carbon nanotubes naturally contain both semiconducting and metallic nanotubes, which is detrimental to electronic applications but beneficial to cryptographic keys application. By setting an additional threshold current of 10 nA at gate voltage of 0 V, one is able to discriminate between switching and non-switching devices among those connected devices. 2-state random bits can thus be upgraded to 3-state random bits (FIG. 27d), which is not available in most of the programmable devices. In FIG. 27d, white dots are semiconducting devices, black dots are open devices, and textured dots are non-switching devices. The number of possible combinations in 3-state bits ($C_3$) is the number of possible combinations in 2-state bits $C_2(n,m)$ times $C(m,l)$ where n is the total device number, m is the connected device number, and l is the number of semiconducting devices out of m. A simplified formula is then obtained for $\ln(C_2(n,m)C(m,l))$ as $\ln(C_2(n,m)C(m,l)) \approx -n(\gamma(\alpha)+\alpha\gamma(\beta))$, where $\alpha$ and $\beta$ are connection yield and semiconducting purity respectively (see above). By taking the partial derivative of function $\ln(C_2(n,m)C(m,l))$ with respect to $\alpha$ and $\beta$, the most possible combination can be calculated based on a 3-state 48-bit key to be $7.71 \times 10^{22}$, which is 8 orders of magnitude more than that of a 2-state 48-bit key ($2.81 \times 10^{14}$). The function $C_2(n,m)C(m,l)$ is symmetric about the axis of $\beta=0.5$ with the peak a little skewed toward the axis of $\alpha=0.67$, as plotted in FIG. 27e. The key size is 48-bit. Therefore, by optimizing the connection yield and semiconducting purity in 3-state bit design, the security level of carbon nanotube cryptographic keys can be significantly enhanced without increasing the physical size of the bit array.

Figure 28:
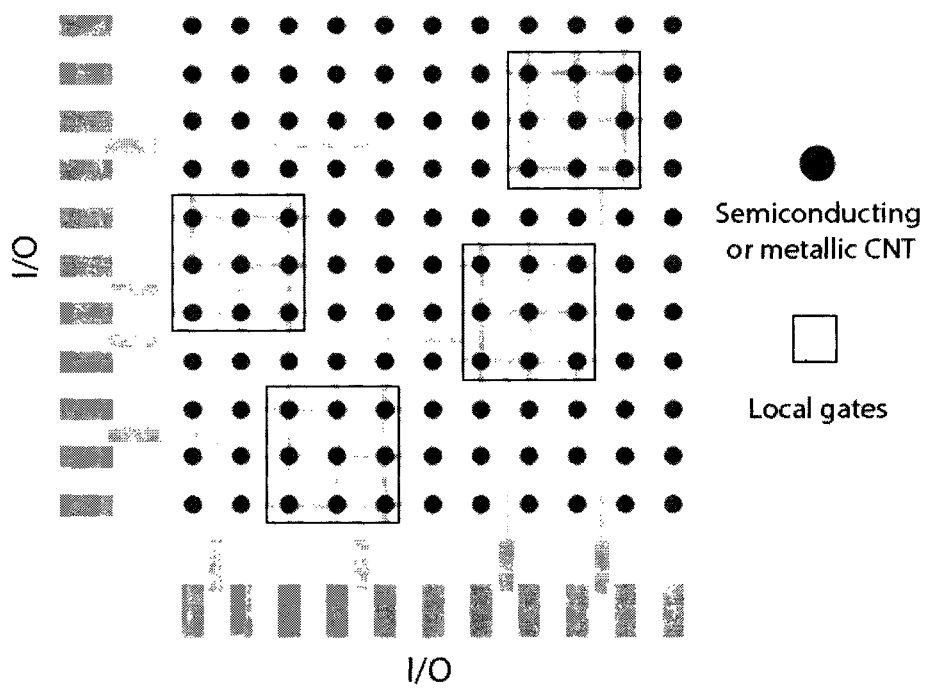
FIG. 28 is a diagram illustrating random bits devices with local gates according to an embodiment of the present invention.

One key feature of an ideal cryptographic key technology is the capability to prevent any unauthorized duplication. The carbon nanotube key possesses physical unclonability originated from the randomness of nanoscale diffusion and drift process. Even knowing the same fabrication process, it is impossible to clone the same carbon nanotube key. Optical methods do not have enough resolution to detect the presence of a single nanotube in the trench. Electron microscope imaging requires chip reverse-engineering process, which can easily destroy the nanotube. Attacks by electrical measurement are possible only if knowing the lead layout. In addition, utilizing the switching behavior of semiconducting nanotubes by incorporating local gates as additional inputs makes the already difficult process even more daunting. As shown in FIG. 28, the designation of local gates affects the local response of semiconducting carbon nanotubes, thus much more complicated input-output pairs can be realized in this design. Adding more freedom by mixing gates with other inputs makes the measurement more difficult without knowing the layout of local gates.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for processing a cryptographic key, the method comprising the steps of:
    forming the cryptographic key which comprises an array of memory bits oriented along at least one bit line and at least one word line, wherein each of the memory bits comprises a selecting transistor having a source and a drain interconnected by a channel and a gate over the channel, wherein the gate is connected to the at least one word line, and wherein for at least one of the memory bits in the array the source is connected to the at least one bit line via either a metallic carbon nanotube or a semiconducting carbon nanotube, wherein the forming step further comprises: randomly depositing either the metallic carbon nanotube or the semiconducting carbon nanotube to form an interconnect between the source and the at least one bit line, whereby a randomness of whether the interconnect of a given one of the memory bits is formed from the metallic carbon nanotube or the semiconducting carbon nanotube is the cryptographic key;
    reading an output state of each of the memory bits; and
    storing the output state of each of the memory bits in a server.

2. The method of claim 1, wherein the output state of each of the memory bits is read using a wafer probe from a readout pad connected to the cryptographic key via an electronic fuse (e-fuse), the method further comprising the step of:
    blowing the e-fuse once the output state of each of the memory bits has been read.

3. The method of claim 1, wherein the at least one word line is part of a first metal layer of the cryptographic key and the bit line is part of a second metal layer of the cryptographic key, wherein a dielectric material is present between the first metal layer and the second metal layer, and wherein the step of forming the cryptographic key comprises the steps of:
    forming trenches in the dielectric material adjacent to the at least one bit line; and
    placing the carbon nanotube within one of the trenches.

4. The method of claim 3, wherein one of the trenches is present for each of the memory bits adjacent to the at least one bit line.

5. The method of claim 3, wherein the dielectric material is a bilayer comprising a $SiO_2$ layer over a $HfO_2$ layer, wherein the step of forming the trenches in the dielectric material comprises the steps of:
    forming the trenches in the $SiO_2$ layer such that the $HfO_2$ layer remains present within the trenches; and
    selectively forming a monolayer of NMPI within the trench on the $HfO_2$ layer.

6. The method of claim 5, wherein the step of forming the cryptographic key comprises the steps of:
    preparing an aqueous solution of carbon nanotubes comprising both metallic carbon nanotubes and semiconducting carbon nanotubes, wherein the carbon nanotubes are wrapped in a surfactant; and
    contacting the aqueous solution of the carbon nanotubes with the monolayer of NMPI such that by way of attractive forces between the NMPI monolayer which is positively charged and the surfactant which is negatively charged the carbon nanotubes self-assemble within the trenches, and wherein the carbon nanotubes that self-assemble within the trenches are randomly either the metallic carbon nanotubes or the semiconducting carbon nanotubes.

7. The method of claim 6, wherein the surfactant comprises SDS.

8. The method of claim 6, wherein each of the trenches formed in the $SiO_2$ layer is configured to have a width such that either one or none of the carbon nanotubes self-assemble within each of the trenches based on one or more of i) the attractive forces between the NMPI monolayer which is positively charged and the surfactant which is negatively charged and ii) repulsive forces between the $SiO_2$ layer which is negatively charged and the surfactant which is negatively charged.

* * * * *